US012313195B2

(12) United States Patent
Michael et al.

(10) Patent No.: US 12,313,195 B2
(45) Date of Patent: May 27, 2025

(54) MULTICABLE CLIP

(71) Applicant: SHOALS TECHNOLOGIES GROUP, LLC, Portland, TN (US)

(72) Inventors: Dorothy Michael, Greenbrier, TN (US); Dean Solon, Gallatin, TN (US)

(73) Assignee: SHOALS TECHNOLOGIES GROUP, LLC, Portland, TN (US)

( * ) Notice: Subject to any disclaimer, the term of this patent is extended or adjusted under 35 U.S.C. 154(b) by 31 days.

(21) Appl. No.: 18/295,830

(22) Filed: Apr. 4, 2023

(65) Prior Publication Data
US 2023/0323981 A1 Oct. 12, 2023

Related U.S. Application Data

(60) Provisional application No. 63/362,737, filed on Apr. 8, 2022.

(51) Int. Cl.
*F16L 3/10* (2006.01)
*F16L 3/223* (2006.01)

(52) U.S. Cl.
CPC ........... *F16L 3/1091* (2013.01); *F16L 3/2235* (2013.01)

(58) Field of Classification Search
CPC ........ F16L 3/1091; F16L 3/2235; H02G 3/32; H02G 9/04
See application file for complete search history.

(56) References Cited

U.S. PATENT DOCUMENTS

| D427,048 | S  | * | 6/2000 | Potter | ........................... D8/356 |
| 6,249,636 | B1 | * | 6/2001 | Daoud | ................. G02B 6/4471 385/136 |
| 6,701,056 | B2 | * | 3/2004 | Burek | ................. G02B 6/4471 385/137 |

(Continued)

FOREIGN PATENT DOCUMENTS

| CA | 2985303 A1 * | 5/2012 | ........... H02G 3/0437 |
| CN | 103972827 A * | 8/2014 | |

(Continued)

OTHER PUBLICATIONS

Panduit stackable cable rack spacer datasheet, https://www.panduit.com/content/dam/panduit/en/products/media/3/13/013/8013/8013.pdf (Year: 2001).*

(Continued)

*Primary Examiner* — Eret C McNichols
*Assistant Examiner* — Ding Y Tan
(74) *Attorney, Agent, or Firm* — MASCHOFF BRENNAN

(57) ABSTRACT

In an example, a multicable clip includes an elongate base, cradles, and first and second pedestals. The base has a first end and a second end opposite the first end. The cradles extend from the base, each of the cradles configured to receive a corresponding cable, each of the cradles having a narrower width at its opening than within the cradle. The first pedestal is formed at the first end of the base, the first pedestal having a first shoulder to engage a first retention flange of a cable raceway. The second pedestal is formed at the second end of the base, the second pedestal having a second shoulder to engage a second retention flange of the cable raceway. The first and second pedestals are configured to couple the multicable clip to one or more installation structures.

21 Claims, 14 Drawing Sheets

(56) References Cited

U.S. PATENT DOCUMENTS

| | | | | |
|---|---|---|---|---|
| 7,712,709 | B2* | 5/2010 | Winchester | F16L 3/223 |
| | | | | 248/89 |
| 8,262,035 | B2* | 9/2012 | Bleus | F16L 3/1025 |
| | | | | 248/65 |
| 9,288,922 | B2* | 3/2016 | Liu | H01R 13/6277 |
| D755,043 | S* | 5/2016 | Bailey | D8/394 |
| 9,841,123 | B1* | 12/2017 | White | H02G 3/0608 |
| 10,123,449 | B1* | 11/2018 | Stevens | H05K 5/0217 |
| 10,670,169 | B2* | 6/2020 | Etheridge | H02G 3/32 |
| 11,125,358 | B2* | 9/2021 | Leeson | H02G 3/32 |
| D974,879 | S* | 1/2023 | Wu | D8/382 |
| 2010/0258685 | A1* | 10/2010 | Gardner | F16L 3/13 |
| | | | | 248/68.1 |
| 2021/0247002 | A1* | 8/2021 | Dallmann | H02G 3/32 |

FOREIGN PATENT DOCUMENTS

| | | | | |
|---|---|---|---|---|
| EP | 0569297 A1 | | 11/1993 | |
| GB | 2436641 A | * | 10/2007 | H04Q 1/06 |
| WO | WO-2018151613 A1 | * | 8/2018 | H02G 3/263 |

OTHER PUBLICATIONS

WKK push mount cable ties youtube video dated Jun. 8, 2020, https://www.youtube.com/watch?v=PLTmxtUJRrQ (Year: 2020).*

Panduit stackable cable rack spacers product page, date 2001, https://www.panduit.com/content/dam/panduit/en/products/media/3/13/013/8013/8013.pdf (Year: 2001).*

International Search Report and Written Opinion for International Application No. PCT/US3/0176508 mailed Aug. 2, 2023, 9 pgs.

* cited by examiner

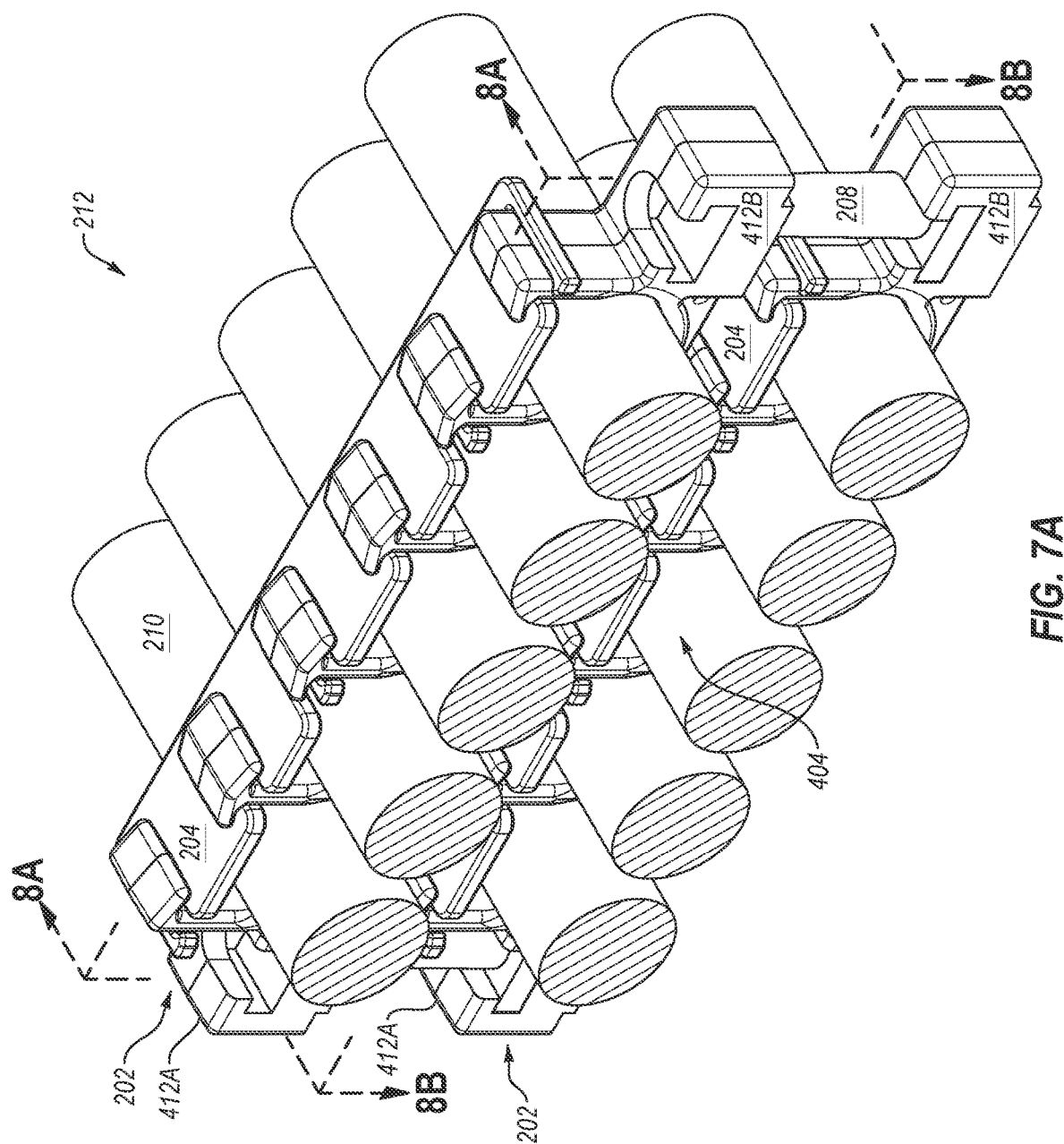

MULTICABLE CLIP

CROSS-REFERENCE TO RELATED APPLICATION

This application claims the benefit of and priority to U.S. Provisional App. No. 63/362,737 filed Apr. 8, 2022 and which is herein incorporated by reference in its entirety.

FIELD

The embodiments discussed herein are related to a multicable clip in electric vehicle (EV) charger systems.

BACKGROUND

Unless otherwise indicated herein, the materials described herein are not prior art to the claims in the present application and are not admitted to be prior art by inclusion in this section.

Typical electric vehicles (EVs) operate on large on-board energy storage cells or rechargeable batteries. EV battery capacity limits the distances EVs can travel on a single charge from and/or between a user's home EV charger system and commercial EV charger systems (e.g., charging stations). Commercial EV charger infrastructure has historically included sparsely located EV charger systems at haphazard or ad hoc locations. The sparsity of commercial EV charger infrastructure is an impediment to the widespread adoption of EVs.

The subject matter claimed herein is not limited to implementations that solve any disadvantages or that operate only in environments such as those described above. Rather, this background is only provided to illustrate one example technology area where some implementations described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

In an example embodiment, a multicable clip includes an elongate base, cradles, and first and second pedestals. The base has a first end and a second end opposite the first end. The cradles extend from the base, each of the cradles configured to receive a corresponding cable, each of the cradles having a narrower width at its opening than within the cradle. The first pedestal is formed at the first end of the base, the first pedestal having a first shoulder to engage a first retention flange of a cable raceway. The second pedestal is formed at the second end of the base, the second pedestal having a second shoulder to engage a second retention flange of the cable raceway. The first and second pedestals are configured to couple the multicable clip to one or more installation structures.

In another example embodiment, a multicable clip includes a base, clip arms, and cradle retention fingers. The clip arms extend in a common direction from the base, each of the clip arms having a first end at the base and a second end opposite the first end. Each pair of adjacent clip arms and the base forms a cradle configured to receive a portion of a corresponding cable. The cradle retention fingers extend from the second ends of the clip arms, including a cradle retention finger extending from the second end of each clip arm toward an adjacent clip arm. A cradle width between the clip arms of each cradle is greater than or equal to an outer diameter of the corresponding cable. An opening width of each cradle at its opening and between cradle retention fingers extending from adjacent clip arms of each cradle is less than the outer diameter of the corresponding cable. Each of the clip arms is resiliently deformable and configured to resiliently deform in response to passage of the corresponding cable through the corresponding opening of the corresponding cradle.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 7A is a top front perspective view of stacked retention assembly of the cable management system of FIGS. 2A-2C;

DETAILED DESCRIPTION OF SOME EXAMPLE EMBODIMENTS

Approximately half of an EV infrastructure deployment cost is associated with temporal aspects of the deployment: power entry equipment, cables, skids, extensive civil work, and long cable runs and connectors. To meet EV deployment goals, charge point operators need to speed deployment while simultaneously reducing costs. Embodiments herein relate to a multicable clip of a cable management system that may be implemented in EV infrastructure deployments and that may speed deployment and/or reduce cost compared to other cable management systems.

An example cable management system includes one or more multicable clips, one or more retention plates, one or more risers, and/or a cable raceway. Each multicable clip includes multiple cradles to receive and secure cables, such as EV charger system cables, with a pedestal at each end of the multicable clip to couple the multicable clip to one or more installation surfaces or other installation structures. For example, the pedestals may be used to couple the multicable clip to a floor, wall, ceiling, or other structure or surface. Alternatively or additionally, risers may be used to stack multiple multicable clips together, with each riser being coupled between corresponding pedestals of two multicable clips spaced apart by the riser. After cables are positioned in cradles of a given multicable clip, a corresponding retention plate may be coupled to the multicable clip to secure the cables within the cradles of the multicable clip. Each retention plate may include spacers that block openings of the cradles when the retention plate is coupled to the multicable clip. Each retention plate may additionally include retention plate fingers to secure the retention plate to the multicable clip. The cable raceway may engage with one or more of the multicable clips to at least partially enclose the one or more multicable clips, one or more retention plates, and the cables. For example, the cable raceway may include two retention flanges that engage shoulders formed in pedestals of a given multicable clip. Some embodiments disclosed herein may be less expensive and take less time to install than other arrangements, such as arrangements in which trenches are dug, cables are installed in the trenches, and the trenches are backfilled.

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

Figure 1:
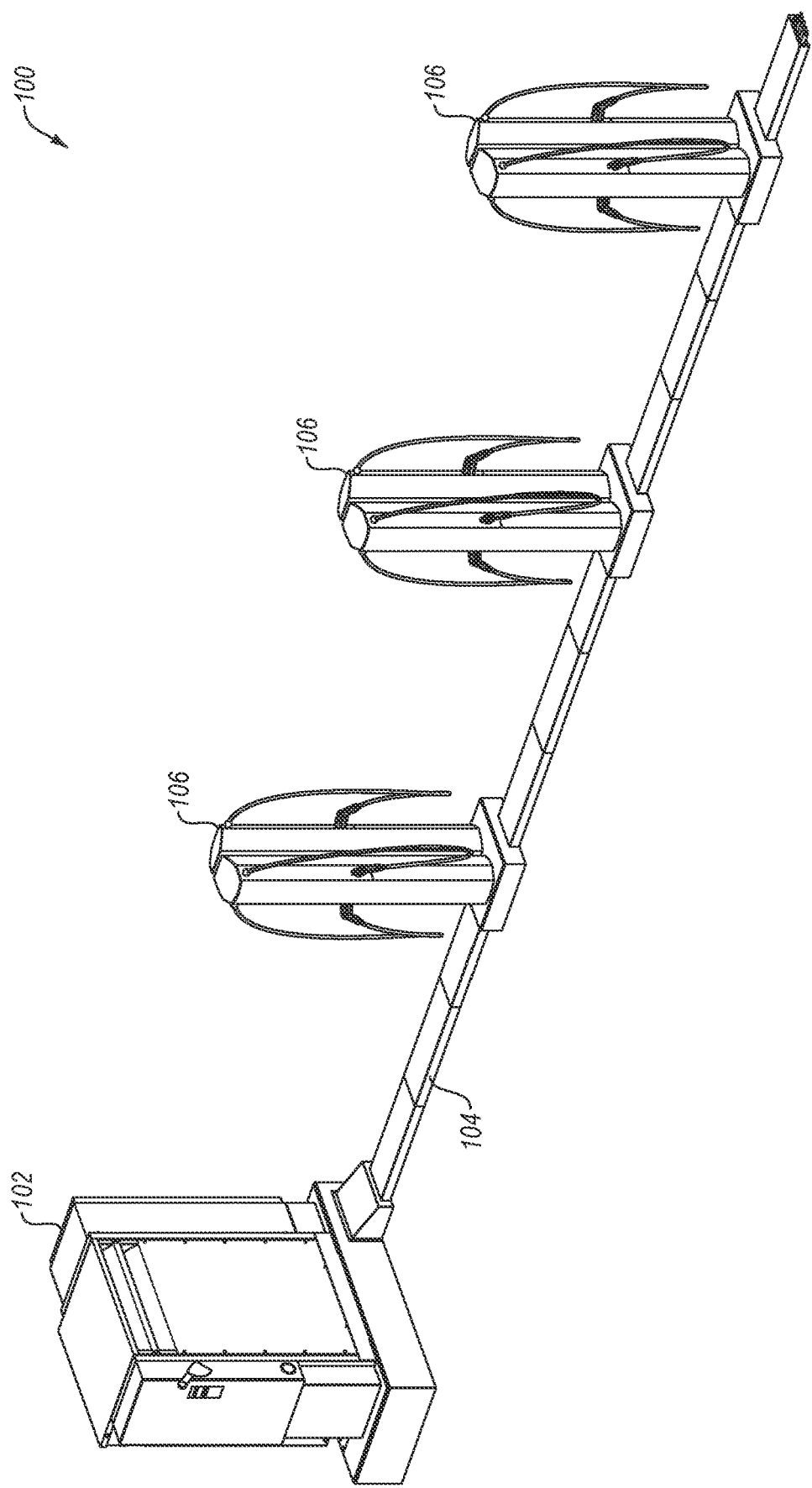
FIG. 1 is a perspective view of an example EV charger system that includes a power conversion device, cable management systems, one or more electrical cables, and one or more charger skids.

FIG. 1 is a perspective view of an example EV charger system 100 that includes a power conversion device 102, cable management systems 104, one or more electrical cables (not shown in FIG. 1), and one or more charger skids 106, arranged in accordance with at least one embodiment described herein. The power conversion device 102 may be coupled to a power source (not shown), such as a power grid or solar array. The power conversion device 102 may be configured to transform power from the power source for compatibility with EV vehicles and/or the charger skids 106.

The charger skids 106 are electrically coupled through the electrical cables to the power conversion device 102. Each of the charger skids 106 may include one or more EV chargers. As illustrated in FIG. 1, each charger skid 106 includes four EV chargers. In this and other embodiments, each of the charger skids 106 may be installed at the intersection of four vehicle parking spots or stalls to allow up to four EVs to be charged simultaneously through the charger skid 106.

Each cable management system 104 extends between the power conversion device 102 and one of the charger skids 106 or between two charger skids 106 to house and secure the electrical cables. The cable management systems 104 may eliminate the need for trenching as required in some other EV charger systems as the electrical cables may be installed above ground and protected within the cable management systems 104. The cable management systems 104 may be routed on the ground or floor (e.g., of a parking lot, parking structure, or the like). More generally, the cable management systems 104 may be routed on any installation surface or structure, such as a floor, a wall, a ceiling, or other installation surface.

Figure 2A:
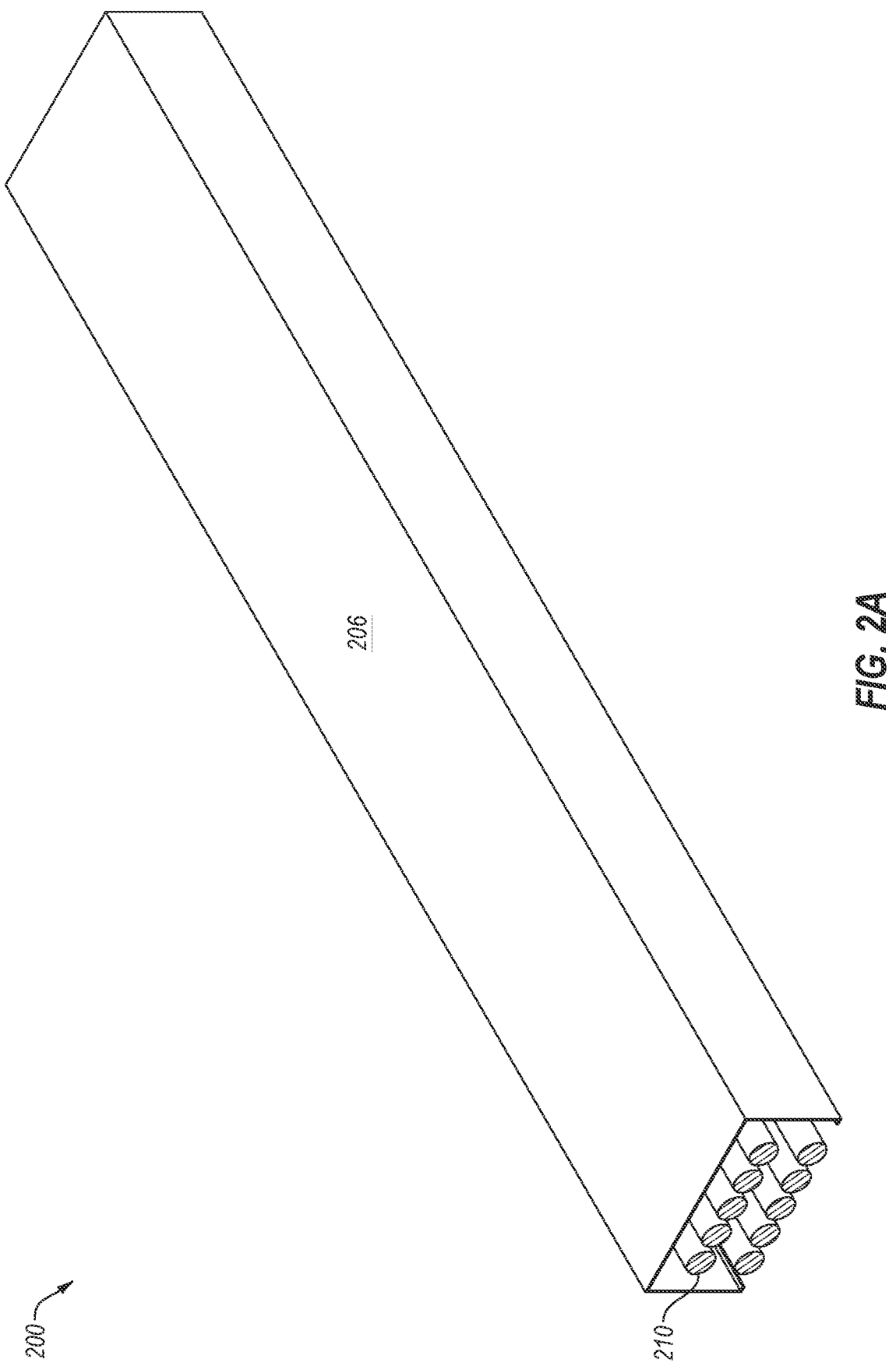
FIGS. 2A-2C illustrate an example cable management system that may be included in the system of FIG. 1.
Figure 2B:
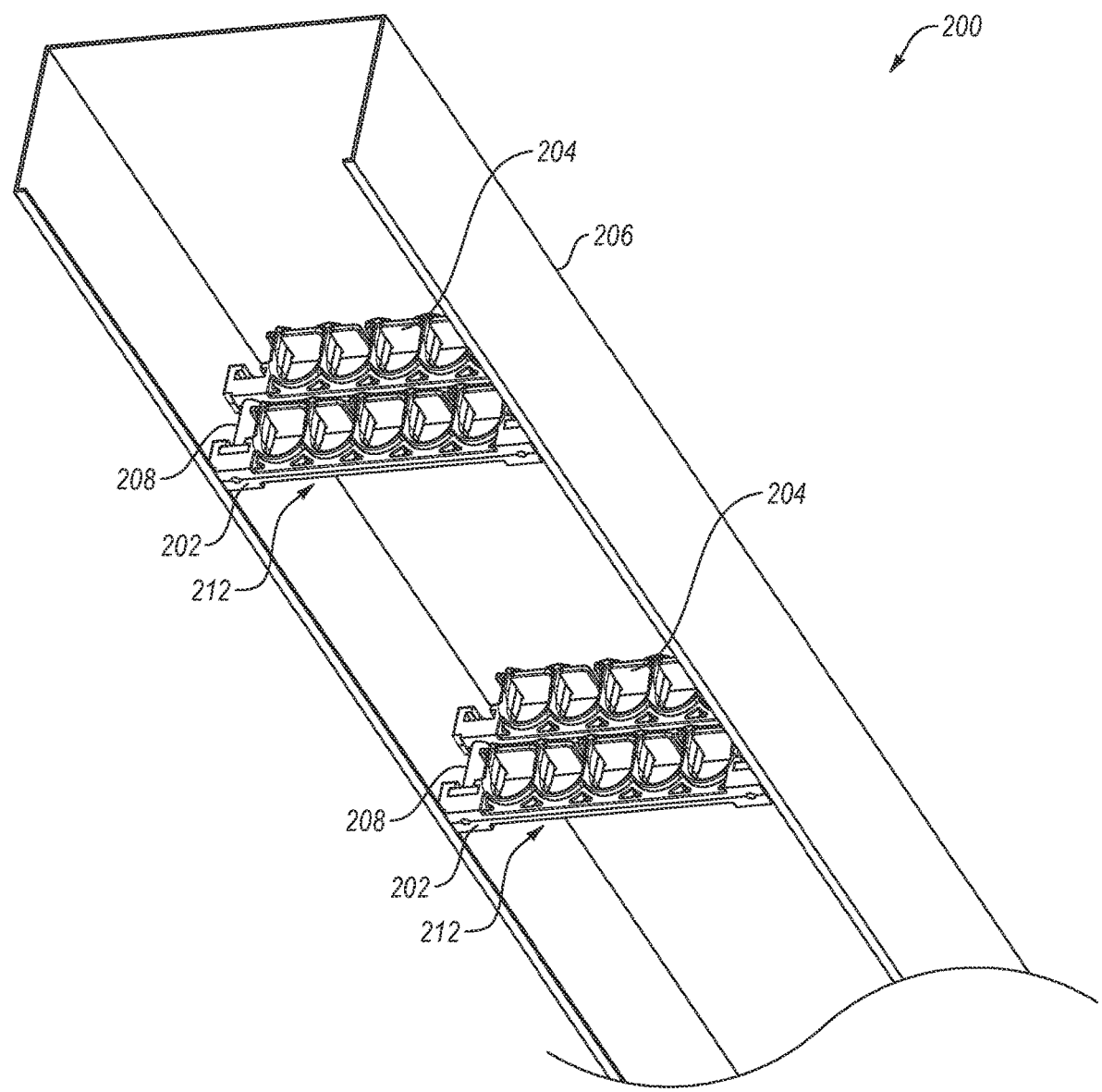
Figure 2C:
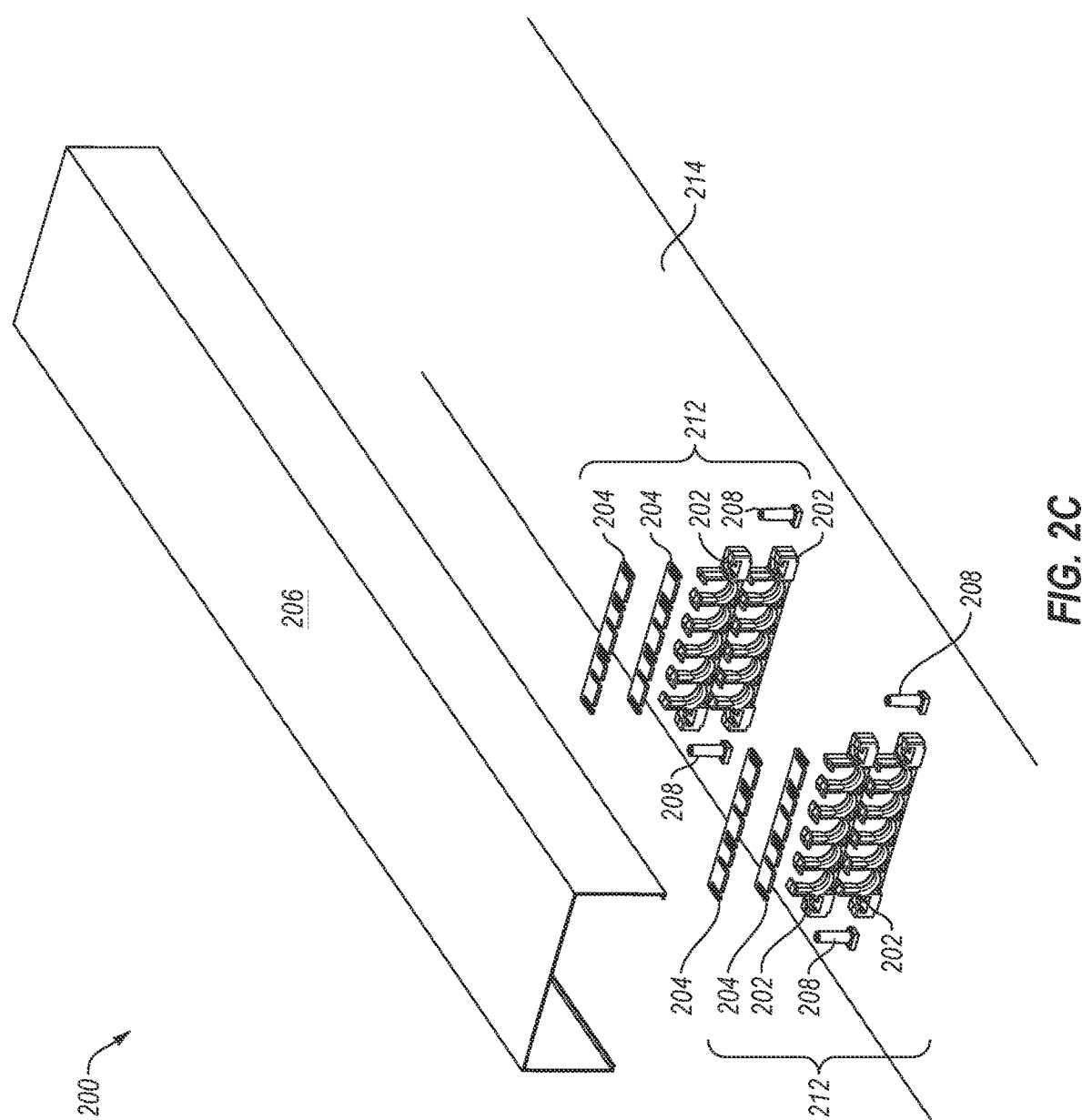

FIGS. 2A-2C illustrate an example cable management system 200 (hereinafter "system 200"), arranged in accordance with at least one embodiment described herein. The system 200 may include, be included in, or correspond to one or more of the cable management systems 104 of FIG. 1. FIGS. 2A, 2B, and 2C respectively include a top front perspective view, a bottom front perspective view, and an exploded top front perspective view of the system 200. As illustrated, the system 200 may include one or more multicable clips 202, one or more retention plates 204, a cable raceway 206, and/or one or more risers 208. FIG. 2A additionally illustrates example electrical cables 210 ("cables 210") that may be managed by the system 200. Only one of the cables 210 is labeled in FIG. 2A for simplicity. The cables 210 are omitted from FIGS. 2B and 2C for clarity.

Each multicable clip 202 includes multiple cradles to receive and secure multiple cables 210. In particular, each of the multicable clips 202 includes five cradles to receive and secure five cables 210. The retention plates 204 couple to the multicable clips 202 to retain the cables 210 in the cradles after placement therein. As illustrated, each of the multicable clips 202 is stacked with another multicable clip 202 through the risers 208. The risers 208 couple the multicable clips 202 together (optionally with one or more threaded fasteners or other fasteners).

A set of stacked multicable clips 202 together with corresponding retention plates 204 and risers 208 (and optional fasteners) may be referred to herein as a stacked retention assembly 212. Two stacked retention assemblies 212 are at least partially visible in each of FIGS. 2B and 2C. The stacked retention assemblies 212 may be spaced apart along a length of the cable raceway 206 to provide support and management of the cables 210 along the length of the cable raceway 206. For example, the stacked retention assemblies 212 may be spaced every 18 to 24 inches. By stacking multiple multicable clips 202 together, each stacked retention assembly 212 may secure in a single location along the length of the cable raceway 206 more cables 210 than a single multicable clip 202 by itself. The illustrated embodiment depicts ten cables 210 secured by each of the stacked retention assemblies 212 which is twice as many as one of the multicable clips 202 alone.

Within each stacked retention assembly 212, one of the multicable clips 202 will be closer to and/or coupled directly to an installation surface 214 while the other multicable clip(s) 202 is(are) spaced further from the installation surface 214. The multicable clip 202 that is closest to and/or coupled directly to the installation surface 214 may be referred to herein as a base multicable clip 202. The multicable clip(s) 202 that is(are) spaced further from the installation surface 214 than the base multicable clip 202 may be referred to herein as the elevated multicable clip(s) 202 because it is spaced apart from or elevated relative to the installation surface 214. The use of "base" and "elevated" in describing the multicable clips 202 in stacked retention assemblies should not be construed to require that the stacked retention assemblies 212 have a particular orientation relative to any given reference frame. Rather, the use of "base" and "elevated" in describing the multicable clips 202 in stacked retention assemblies 212 is merely used as an aid in distinguishing between the multicable clips 202 in a stacked retention assembly 212 notwithstanding any particular orientation they may have relative to a given reference frame. In FIG. 2C, the installation surface 214 may be a floor or ground (i.e., gravity is down) such that the multicable clip 202 at the bottom of each stacked retention assembly 212 is the base multicable clip 202 while the other multicable clip 202 in each stacked retention assembly 212 is the elevated multicable clip 202.

The cable raceway 206 may be configured to engage at least one of the multicable clips of each stacked retention assembly 212 along its length to at least partially enclose the stacked retention assemblies 212 (or portions thereof) and the cables 210.

Substitutions, modifications, additions, etc. may be made to FIGS. 2A-2C without altering the scope of the disclosure. For example, the system 200 may have a single multicable clip 202 and retention plate 204 at each supported location along the length of the cables 210 instead of a stacked retention assembly 212. Alternatively or additionally, while a height of the cable raceway 206 is illustrated as accommodating a base multicable clip 202 and one elevated multicable clip 202, the height of the cable raceway 206 may be reduced to accommodate a single multicable clip 202 (e.g., a base multicable clip 202 without any elevated multicable clips 202) or increased to accommodate three or more multicable clips 202 (e.g., a base multicable clip 202 with two or more elevated multicable clips 202) in a given stacked retention assembly 212.

Figure 3:
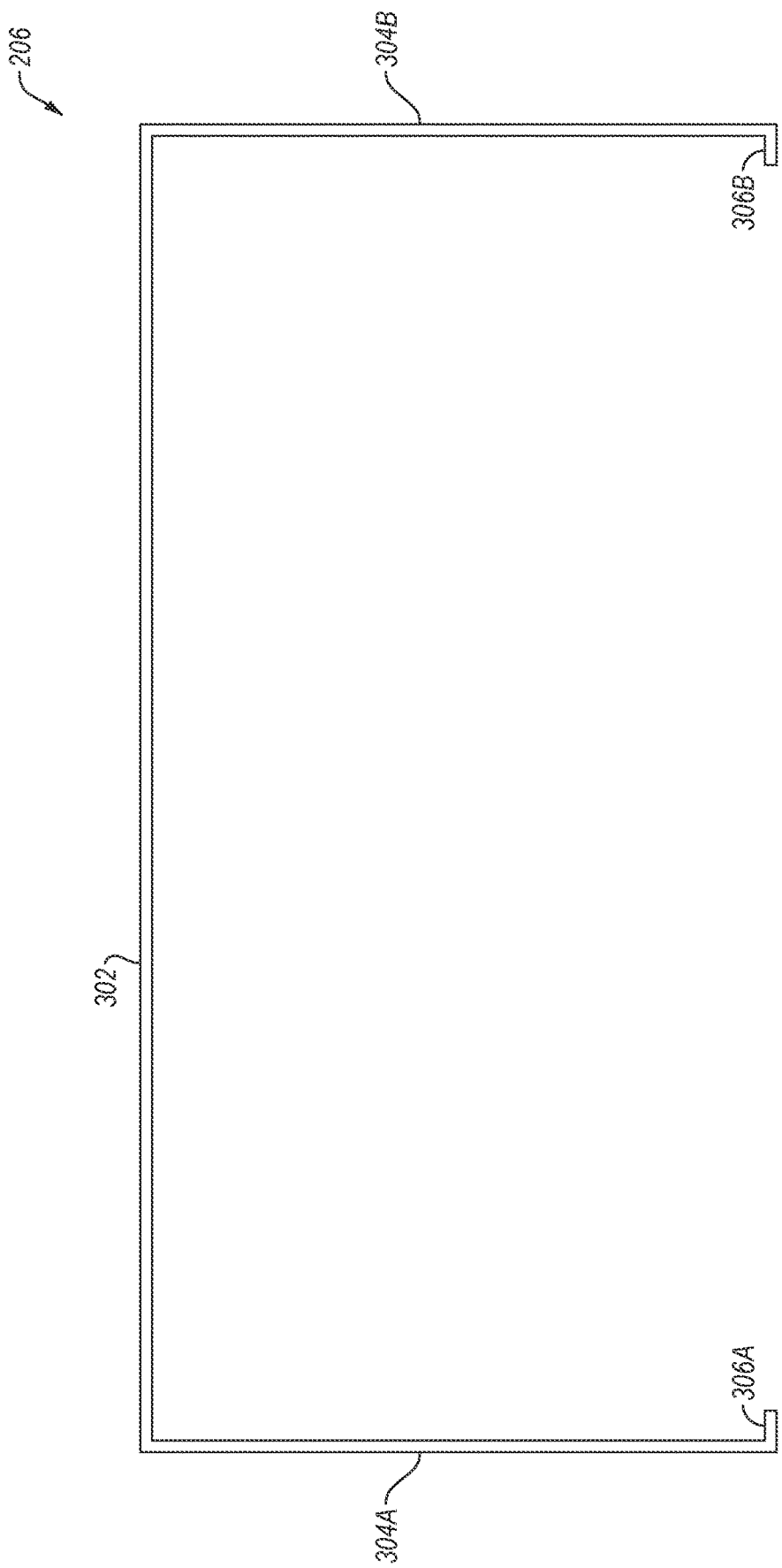
FIG. 3 is a front view of a cable raceway of the cable management system of FIGS. 2A-2C.

FIG. 3 is a front view of the cable raceway 206 of the system 200 of FIGS. 2A-2C, arranged in accordance with at least one embodiment described herein. The cable raceway 206 includes a base wall 302 and first and second sidewalls 304A, 304B (hereinafter collectively "sidewalls 304" or generically "sidewall 304") extending from the base wall 302. As illustrated, the sidewalls 304 extend orthogonally from the base wall 302. In other embodiments, the sidewalls 304 may extend from the base wall 302 at the same or different acute angle(s) or obtuse angle(s).

The cable raceway 206 further includes first and second retention flanges 306A, 306B (hereinafter collectively "retention flanges 306" or generically "retention flange 306"). The retention flanges 306 extend from the sidewalls 304 inward and/or toward each other. Alternatively or additionally, the retention flanges 306 may extend at least partially toward the base wall 302 and/or in other directions. The retention flanges 306 may be configured to engage an installation structure, one or more components of the system 200 such as some or all of the multicable clips or the like. For example, at least the base multicable clip 202 in each stacked retention assembly 212 that is directly coupled to an installation structure may have one or more shoulders formed therein that engage with the retention flanges 306 to secure the cable raceway 302 to the retention assembly 212.

The cable raceway 206 may be made of sheet metal, polyvinyl chloride (PVC) or other plastic, or other suitable material. In some embodiments, the cable raceway 206 may include a resilient material capable of some elastic deformation or flex, e.g., during installation of the cable raceway 206 on a multicable clip 202 or stacked retention assembly 212, while having sufficient strength to support a load up to a threshold (e.g., 500 lbs.) without failing (e.g., collapsing under the load onto cables and/or other components of the system 200 housed therein).

In some embodiments, the sidewalls 304 are separated by a wall-to-wall distance $d_{ww}$ and the retention flanges 306 are separated by a lip-to-lip distance $d_{ll}$ that is less than the wall-to-wall distance $d_{ww}$. A multicable clip width $w_{mc}$ (FIG. 4A) of the multicable clips 202 to which the cable raceway 206 is coupled may be less than or equal to the wall-to-wall distance $d_{ww}$. When the cable raceway 206 is coupled to a multicable clip 202, a spreading force may be applied to the sidewalls 304 to cause the sidewalls 304 to flex outward to temporarily increase the lip-to-lip distance $d_{ll}$ to greater than the multicable clip width $w_{mc}$. With the lip-to-lip distance $d_{ll}$ temporarily increased, the cable raceway 302 may be moved relative to the multicable clip 202 until the retention flanges 306 clear the multicable clip 202. After the retention flanges 306 clear the multicable clip 202, the spreading force may be removed from the sidewalls 304, allowing the sidewalls 304 to at least partially return to their unspread state. Insofar as the lip-to-lip distance $d_{ll}$ is less than the multicable clip width $w_{mc}$, the retention flanges 306 of the cable raceway 206 may engage the multicable clip 202 to secure the cable raceway 206 to the multicable clip 202.

Figure 4A:
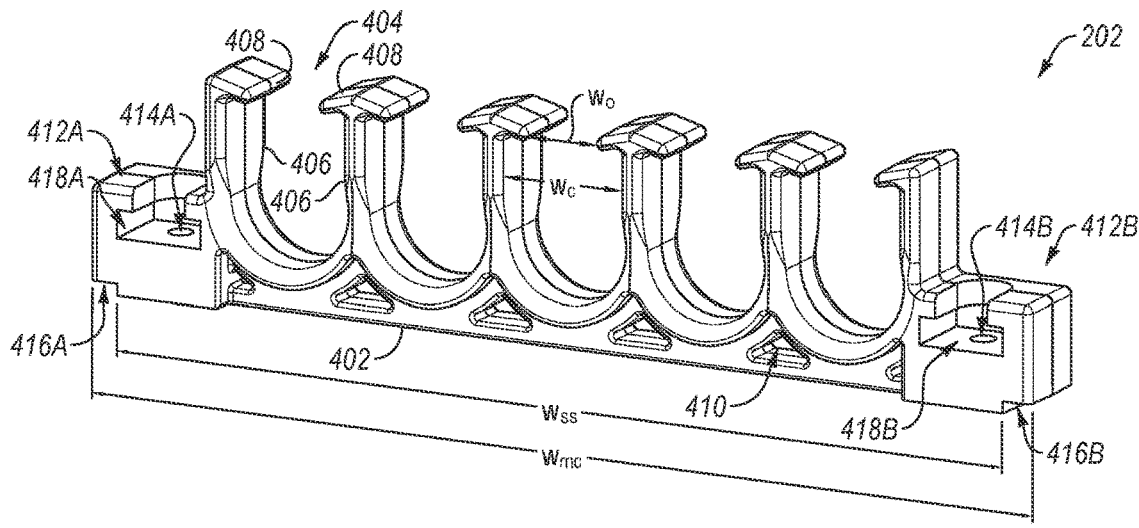
FIGS. 4A and 4B include perspective views of a multicable clip of the cable management system of FIGS. 2A-2C.
Figure 4B:
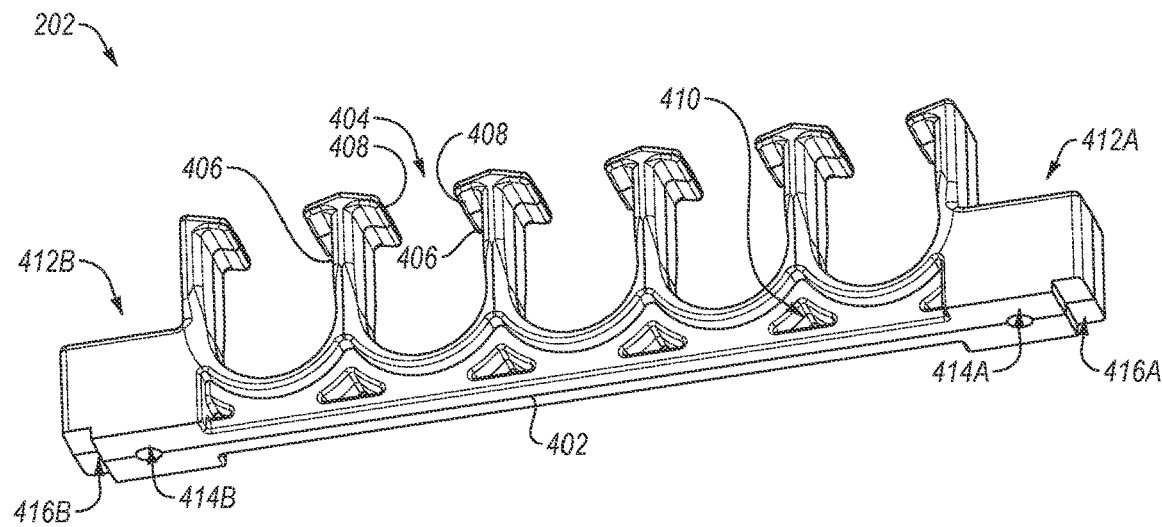

FIGS. 4A and 4B include perspective views of one of the multicable clips 202 of the system 200 of FIGS. 2A-2C, arranged in accordance with at least one embodiment described herein. More particularly, FIG. 4A includes a top front perspective view and FIG. 4B includes a bottom rear perspective view of the multicable clip 202. Each of the multicable clips 202 of FIGS. may be configured similarly or identically to the multicable clip 202 of FIGS. 4A and 4B. As illustrated in FIGS. 4A and 4B, the multicable clip 202 includes a base 402 with multiple cradles 404 extending from the base 402. Only one of the cradles 404 is labeled in each of FIGS. 4A and 4B for simplicity.

The multicable clip 202 may further include clip arms 406 extending from the base 402. The clip arms 406 may extend in a common direction from the base 402, e.g., orthogonally, with a first end or proximal end of each clip arm 406 at the base 402 and a second end or distal end of each clip arm 406 opposite the first end. Each of the cradles 404 is formed by the base 402 and a pair of adjacent clip arms 406. Only two clip arms 406 that are adjacent to each other are labeled in FIGS. 4A and 4B for simplicity. Each of the clip arms 406 except the two clip arms 406 at opposing ends of the multicable clip 202 forms a portion of two adjacent cradles 404. The two clip arms 406 at the opposing ends of the multicable clip 202 each forms a portion of a single cradle 404, e.g., of a corresponding one of the cradles 404 at the opposing ends of the multicable clip 202.

The multicable clip 202 may further include cradle retention fingers 408 extending from distal ends of the clip arms 406. Only two cradle retention fingers 408 are labeled in FIGS. 4A and 4B for simplicity. Each of the clip arms 406 except the two clip arms 406 at the opposing ends of the multicable clip 202 includes two cradle retention fingers 408 extending from its distal end. The two clip arms 406 at the opposing ends of the multicable clip 202 each includes a single cradle retention finger 408 extending from its distal end. According to the illustrated arrangement, each cradle 404 includes two cradle retention fingers 408 each extending at least partially toward the other cradle retention finger 408 and/or at least partially toward the opposing clip arm 406.

As illustrated in FIG. 4A, each of the cradles 404 has a cradle width $w_c$ and an opening width $w_o$. Only one of the cradle widths $w_c$ and opening widths $w_o$ is labeled in FIG. 4A for simplicity. Other cradles 404 of the multicable clip 202 may have the same or different cradle widths $w_c$ and/or opening widths $w_o$. The cradle width $w_c$ is the distance between clip arms 406 of a given cradle 404. The opening width $w_o$ is the distance between cradle retention fingers 408 of the given cradle 404. In some embodiments, the cradle width $w_c$ may be greater than or equal to a cable outer diameter $d_o$ (FIG. 7B) of the cables 210 and the opening width $w_o$ may be less than the cable outer diameter $d_o$.

The multicable clip 202 may be made of plastic or other suitable material. In some embodiments, the multicable clip 202 may include a resilient material capable of some elastic deformation or flex, e.g., during installation of the cables 210 into the cradles 404. In these and other embodiments, each of the clip arms 406 may be resiliently deformable. For example, each of the clip arms 406 may be configured to flex outward and/or resiliently deform in response to passage of a corresponding one of the cables 210 through a corresponding opening of a corresponding cradle 404. In more detail, as a cable 210 passes between cradle retention fingers 408 during installation into one of the cradles 404, the passage of the cable 210 forces the cradle w retention fingers 408 of the cradle 404 apart since under normal conditions the opening width $w_o$ may be less than the cable outer diameter $d_o$. Since the cradle retention fingers 408 extend from distal ends of the clip arms 406, the clip arms 406 of the cradle 404 flex outward as the cradle retention fingers 408 are forced apart by passage of the cable 210. After the widest part of the cable 210 passes through the opening (e.g., after half of the cable 210 clears the cradle retention fingers 408), the clip arms 406 may unflex (e.g., gradually) as the cable 210 continues passing between the cradle retention fingers 408, the cradle retention fingers 408 thus returning inward until eventually the cable 210 is fully within the cradle 404. When the cable 210 is fully within the cradle 404, and assuming the cable outer diameter $d_o$ is less than the cradle width $w_c$, the clip arms 406 may be in an unflexed state with the cradle retention fingers 408 no longer forced apart.

In some embodiments, the cradle retention fingers 408 may be sloped or extend partially toward the base 402, in addition to extending toward each other and/or the opposing clip arm 406 of the same cradle 404. Sloping or angling the cradle retention fingers 408 toward the base 402 may facilitate passage of the cables 210 into the cradles 404 as the angle of the cradle retention fingers 408 may convert some cradle-directed force exerted by a cable 210 as it is being inserted into the cradle 404 to an outward-directed or spreading force on the cradle retention fingers 408 and clip arms 406 of the cradle 404. The angle of the cradle retention fingers 408 may also make it more difficult to remove cables 210 from the cradles 404 than to insert cables 210 into the cradles 404 as the angle of the cradle retention fingers 408 when cables 210 are being removed from cradles 404 may not convert (or may convert less of) exit-directed force to outward-directed or spreading force.

The multicable clip 202 may further include openings 410 defined in the base 202 and/or pedestals 412A, 412B (collectively "pedestals 412" or generically "pedestal 412") at opposite ends of the base 202. Only one opening 410 is labeled in each of FIGS. 4A and 4B for simplicity. The openings 410 may be positioned in the base 402 at the proximal ends of the clip arms 406, e.g., a different opening 410 formed in the base 402 at the proximal end of each clip arm 406. Alternatively or additionally, openings 410 may be positioned elsewhere in the base 402.

Each opening 410 may be configured to receive through the opening 410 an elongate fastener such as a zip tie to secure a cable 210 in a cradle 404. For example, and with a cable 210 in a cradle 404, a zip tie may be routed through one opening 410 at the first end of one clip arm 406 of the cradle 404, around the cable 210, through the other opening 410 at the first end of the other clip arm 406 of the cradle 404, and around the cable 210 again to where ends of the zip tie may be joined together.

The pedestals 412 may be formed at opposite ends of the base 402 and/or may be configured to couple the multicable clip 202 to one or more installation structures, such as the installation surface 214 of FIG. 2C. The installation structure may include an installation surface (floor, wall, ceiling, etc.), a riser (such as the risers 208), or other structure to which the multicable clip 202 may be coupled. Each pedestal 412 may define a through hole 414A, 414B (collectively "through holes 414" or generically "through hole 414") configured to receive a fastener. For example, a screw, bolt, or other fastener may be inserted through each through hole 414 to secure the multicable clip 202 to an installation surface (e.g., floor, wall, ceiling) at an installation site, a riser 208, or other installation structure.

Each pedestal 412 has a shoulder 416A, 416B (collectively "shoulders 416" or generically "shoulder 416") formed in the pedestal 412, the shoulders 416 configured to engage the cable raceway 206. More particularly, each shoulder 416 is configured to engage a corresponding retention flange 306 of the cable raceway 206. As illustrated in FIG. 4A, a multicable clip shoulder-to-shoulder width $w_{ss}$ of the multicable clip 202 is less than the multicable clip width $w_{mc}$ and may be less than or equal to the lip-to-lip distance $d_{ll}$ of the cable raceway 206. As previously described, the cable raceway 206 may be coupled to the multicable clip 202 by applying a spreading force to the sidewalls 304 to temporarily increase the lip-to-lip distance $d_{ll}$ while the cable raceway 206 is positioned with the retention flanges 306 aligned to the shoulders 416. When the spreading force is removed with the cable raceway 206 in this position, the sidewalls 304 and retention flanges 306 return inward until the retention flanges 306 are positioned in and engage the shoulders 416.

Each pedestal 412 may further define a riser recess 418A, 418B (collectively "riser recesses 418" or generically "riser recess 418") having an interior shape that is complementary to an exterior shape of a portion of a corresponding riser 208 configured to be received in the riser recess 418. The riser recesses 418 are described in additional detail with reference to FIG. 4C, which is a top front perspective view of the pedestal 412B, arranged in accordance with at least one embodiment described herein. The pedestal 412A and/or other pedestals herein may be the same as, similar to, or different than the pedestal 412B depicted in FIG. 4C.

Figure 4C:
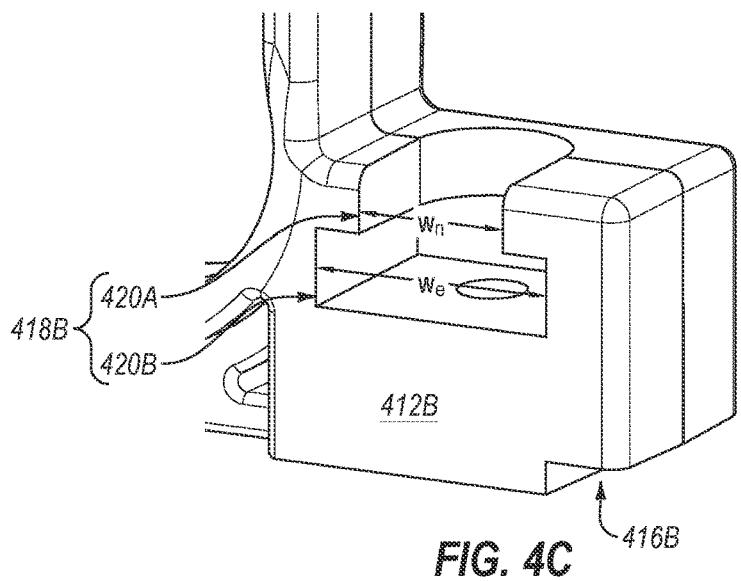
FIG. 4C is a top front perspective view of a pedestal of the multicable clip of FIGS. 4A and 4B.

As illustrated in FIG. 4C, the riser recess 418B may include a neck portion 420A and an enlarged portion 420B. The neck portion 420A may have, at least at its opening, a neck width $w_n$, while the enlarged portion 420B may have, at least at its opening, an enlarged width $w_e$ that is greater than the neck width $w_n$. An interior shape of the enlarged portion 420B may be complementary to an exterior shape of a base of a corresponding riser 208 such that the base of the riser 208 may be received in the enlarged portion 420B of the riser recess 418B. An interior shape of the neck portion 420A may be complementary to an exterior shape of a portion of a column of the riser 208 that is proximate to the base such that the portion of the column of the riser 208 that is proximate to the base of the riser may be received in the neck portion 420A of the riser recess 418B.

Figure 5A:
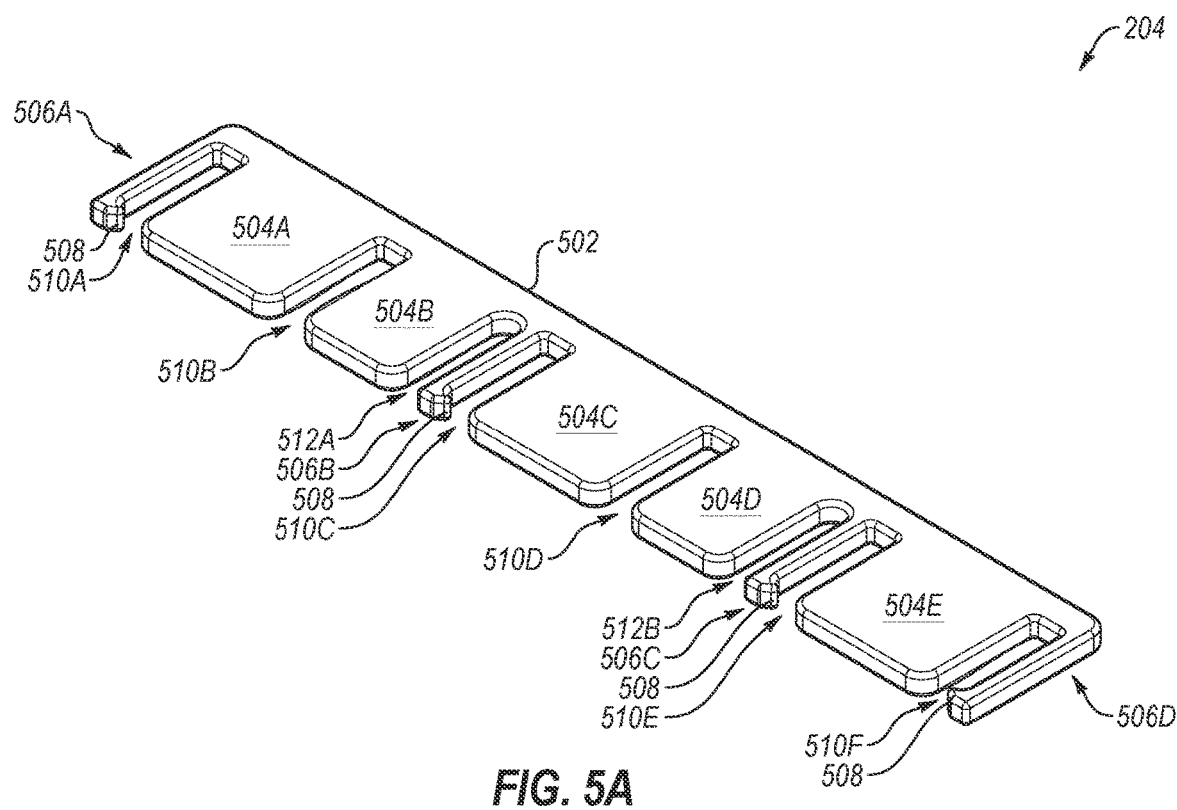
FIGS. 5A and 5B include perspective views of a retention plate of the cable management system of FIGS. 2A-2C.
Figure 5B:
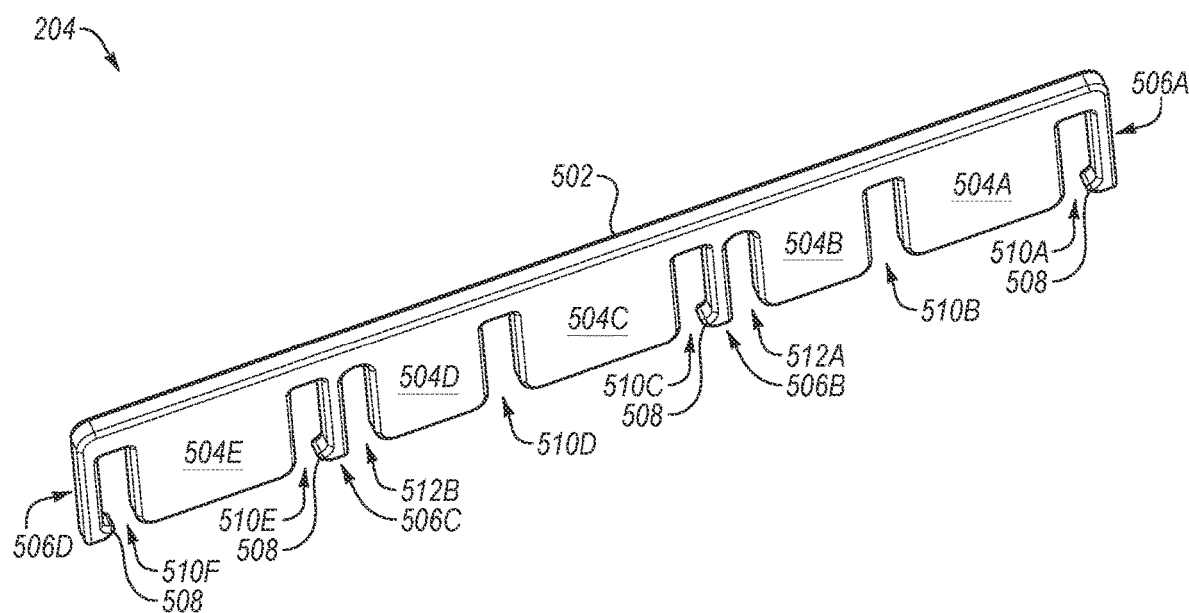

FIGS. 5A and 5B include perspective views of one of the retention plates 204 of the system 200 of FIGS. 2A-2C, arranged in accordance with at least one embodiment described herein. More particularly, FIG. 5A includes a top front perspective view and FIG. 5B includes a bottom rear perspective view of the retention plate 204. Each of the retention plates 204 of FIGS. 2A-2C may be configured similarly or identically to the retention plate 204 of FIGS. 5A and 5B. The retention plate 204 is configured to be coupled to a multicable clip, such as the multicable clip 202.

As illustrated in FIGS. 5A and 5B, the retention plate 204 includes a spine 502 with spacers 504A-504E (collectively "spacers 504" or generically "spacer 504") and plate retention fingers 506A-506D (collectively "plate retention fingers 506" or generically "plate retention finger 506") extending from the spine 502. The spacers 504 may be configured to block openings of the cradles 404 of the multicable clip 202 to retain cables 210 within the cradles 404. The plate retention fingers 506 may be configured to engage some or all of the clip arms 406 to secure the retention plate 204 to the multicable clip 202. In some embodiments, the plate retention fingers 506 include end protrusions 508 configured to engage clips arms 406 to couple the retention plate to the multicable clip 202. A single end protrusion 508 is labeled in each of FIGS. 5A and 5B for simplicity.

The retention plate 204 defines two or more arm voids 510A-510F (collectively "arm voids 510" or generically "arm void 510") and one or more flex voids 512A, 512B (collectively "flex voids 512" or generically "flex void 512") between the spacers 504 and plate retention fingers 506. Each of the plate retention fingers 506 is separated from each corresponding adjacent spacer 504 by a corresponding void 510 or 512. For example, the plate retention finger 506B is separated from the spacer 504B by the flex void 512A and is separated from the spacer 504C by the arm void 510C. Similarly, the plate retention finger 506A is separated from the spacer 504A by the arm void 510A.

Each of the arm voids 510 is configured to receive a corresponding clip arm 406 of the multicable clip 202 when the retention plate 204 is coupled to the multicable clip 202. Each of the clip arms 406 may have a width that is less than or equal to a width of the arm void 510 and greater than a width of an opening of the arm void 510 at the end protrusion 508.

Each of the flex voids 512 is configured to accommodate flexing or deformation of a corresponding one of the plate retention fingers 506 when the retention plate 204 is coupled to the multicable clip 202. In more detail, the retention plate 204 may be made of plastic or other suitable material and/or may include a resilient material capable of some elastic deformation or flex, e.g., during coupling of the retention plate 204 to the multicable clip 202. In these and other embodiments, each of the plate retention fingers 506 may be resiliently deformable. For example, each of the plate retention fingers 506 may be configured to flex backward (i.e., away from the side of the plate retention finger 506 with the end protrusion 508) and/or resiliently deform in response to passage of a corresponding one of the clip arms 406 through a corresponding opening of a corresponding arm void 510. The plate retention fingers 506B and 506C may be specifically configured to flex into the corresponding flex void 512A or 512B, the flex voids 512A and 512B being formed to accommodate flexing of the plate retention fingers 506B and 506C. As a clip arm 406 passes between a front of a plate retention finger 506 (i.e., the side of the plate retention finger 506 with the end protrusion 508) and an adjacent spacer 504 during coupling of the retention plate 204 to the multicable clip 202, the passage of the clip arm 406 forces the plate retention finger 506 to flex backward since under normal conditions the width of the opening of the arm void 510 is less than the width of the clip arm 406. Since the end protrusions 508 extend from ends of the plate retention fingers 506, the plate retention fingers 506 flex backward as the end protrusions 508 are forced backward by the clip arms 406. After the clip arms 406 pass through the openings of the arm voids 510 and all the way into the arm voids 510, the plate retention fingers 506 may be at an unflexed state or reduced flex state.

In some embodiments, the end protrusions 508 may be sloped or angled at their leading surface, where the leading surface of an end protrusion 508 is the surface furthest from the spine 502 of the retention plate 206. Sloped or angled leading surfaces of the end protrusions 508 may facilitate passage of the clip arms 506 into the arm voids 510 as the angle of the leading surfaces of the end protrusions may convert some spine-directed force exerted by a clip arm 406 as it is being inserted into the arm void 510 to backward-directed force on the end protrusion 508 and plate retention finger 506. Alternatively or additionally, the trailing surface of each end protrusion 508 may be sloped or angled positively or negatively to make removal of the retention plate 206 from the multicable clip 202 easier or harder, where the trailing surface of an end protrusion 508 is the surface closest to the spine 502 of the retention plate 206.

Figure 6A:
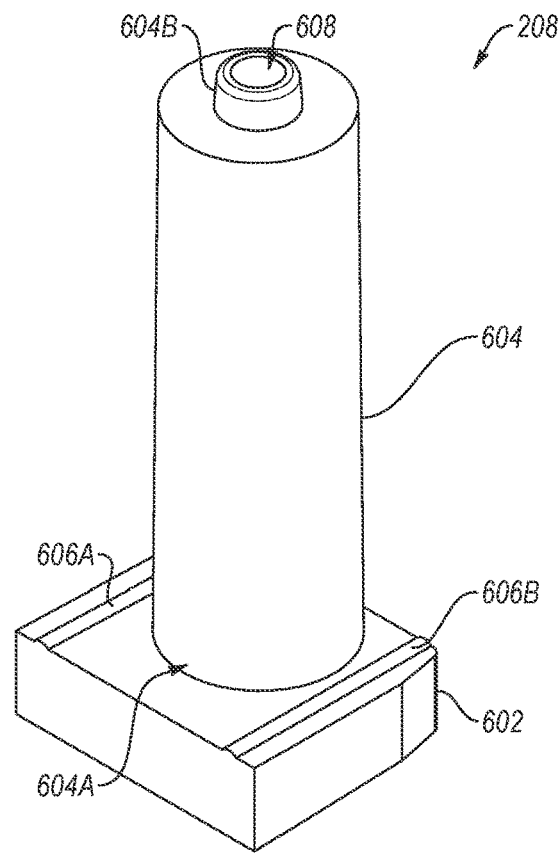
FIGS. 6A and 6B include views of a riser of the cable management system of FIGS. 2A-2C.
Figure 6B:
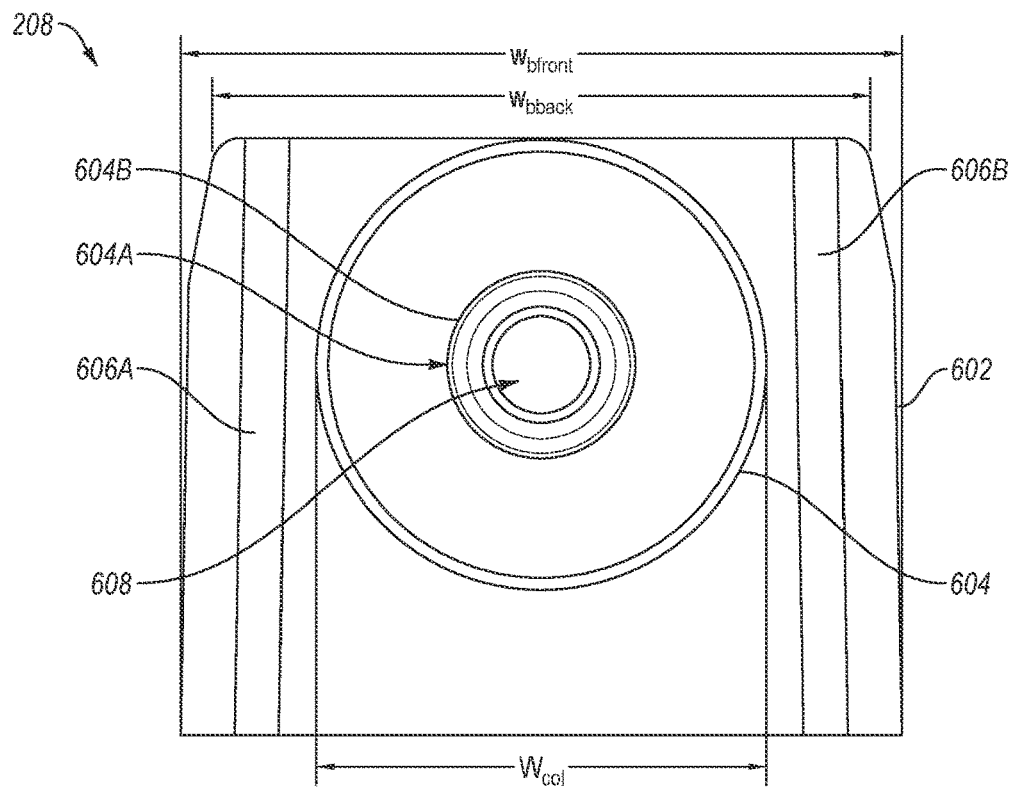

FIGS. 6A and 6B include views of one of the risers 208 of the system 200 of FIGS. 2A-2C, arranged in accordance with at least one embodiment described herein. More particularly, FIG. 6A includes a top front perspective view and FIG. 6B includes an overhead view of the riser 208. Each of the risers 208 of FIGS. 2A-2C may be configured similarly or identically to the riser 208 of FIGS. 6A and 6B. The riser 208 is configured to couple one multicable clip 202 to another multicable clip 202. Alternatively or additionally, the riser 208 is configured to align cradles 404 of one of the multicable clips 202 to cradles 404 of the other multicable clip 202 and/or to space the multicable clips 202 apart from each other.

The riser 208 includes a base 602 and a column 604 that extends from the base 602. A base multicable clip 202 may be coupled to the riser 208 at the base 602 while an elevated multicable clip 202 may be coupled to the riser 208 at an end of the column 604 opposite the base 602. Alternatively or additionally, in a stacked retention assembly 412 that includes two or more elevated multicable clips 202, the elevated multicable clip 202 that is closest to the base multicable clip 202 may be coupled to the riser 208 at the base 602 while the elevated multicable clip 202 that is furthest from the base multicable clip 202 may be coupled to the riser 208 at the end of the column 604 opposite the base 602. For simplicity in the discussion herein, the riser 208 is described as coupling a base multicable clip 202 to an elevated multicable clip 202. However, the discussion applies equally to the coupling by the riser 208 of one elevated multicable clip 202 to another elevated multicable clip 202.

The base 602 is configured to be received within the enlarged portion 420B of the riser recess 418 of the base multicable clip 202 and/or may have an exterior shape that is complementary to an interior shape of the riser recess 418. In some embodiments, the base 602 has a wedge or taper shape, being wider at the front than at the back, where the front is the side of the riser 208 facing outward when the base 602 is positioned within the enlarged portion 420B of the riser recess 418. For example, as illustrated in FIG. 6B, the base 602 may have a front width $w_{bfront}$ that is greater than its back width $w_{bback}$. At least the back width $w_{back}$ of the base 602 may be less than or equal to the enlarged width $w_e$ of the enlarged portion $w_{back}$ of the riser recess 418. In some embodiments, the front width $w_{bfront}$ of the base 602 may be equal to or slightly greater than the enlarged width $w_e$ of the enlarged portion 420B of the riser recess 418. In these and other embodiments, the narrower back width $w_{bback}$ of the base 602 may facilitate easy initial insertion of the base 602 into the enlarged portion 420B of the riser recess 418 while the equal or slightly greater front width $w_{bfront}$ may provide tactile feedback to indicate when the base 602 is fully inserted into the enlarged portion 420B and/or may frictionally secure the base 602 within the enlarged portion 420B when the base 602 is fully inserted.

Alternatively or additionally, the base 602 may include one or more retention ridges 606A, 606B (collectively "retention ridges 606" or generically "retention ridge 606") extending from one or more surfaces of the base 602. The retention ridges 606 are illustrated in FIGS. 6A and 6B as extending from a surface of the base 602 proximate to the column 604. In other embodiments, one or more retention ridges 606 may extend from one or more other surfaces of the base 602. In some embodiments, a height of the base through one of the retention ridges 606 may be equal to or slightly greater than a height of the enlarged portion 420B of the riser recess 418. When the base 602 is inserted into the riser recess 418, the retention ridges 606 may increase friction between the base 402 and a corresponding surface of the riser recess 418 to frictionally secure the base 602 within the enlarged portion 420B.

The column 604 includes a portion 604A proximate to the base 602, the portion 604A being complementary to the neck portion 420A of the riser recess 418. The portion 604A has a column width $w_{col}$ that is less than or equal to the neck width $w_n$ of the neck portion 420A of the riser recess 418. As such, the portion 604A of the column 604 may be received in the neck portion 420A of the riser recess 418 when the riser 208 is coupled to the pedestal 412 of the base multicable clip 202. The neck portion 420A and more generally the overall shapes of the riser recess 418, the base 602, and the portion 604A may prevent the riser 208 from moving relative to the base multicable clip 202 in any direction other than opposite the direction in which the base 602 and the portion 604A of the column 604 are inserted into the riser recess 418.

The column 604 additionally includes a tip 604B configured to be received within the through hole 414 of the pedestal 412 of the elevated multicable clip 202. The tip 604B may have a width less than or equal to an inner diameter of the through hole 414 to be received in the through hole 414. Alternatively or additionally, the tip 604B may define a blind hole 608 and a fastener such as a screw, bolt, or the like, may be inserted through the through hole 414 of the elevated multicable clip 202 and threaded into the blind hole 608 to couple the elevated multicable clip 202 to the riser 208.

FIG. 7A is a top front perspective view of one of the stacked retention assemblies 212 of FIGS. 2A-2C, arranged in accordance with at least one embodiment described herein. Each of the stacked retention assemblies 212 of FIGS. 2A-2C may be configured similarly or identically to the stacked retention assembly 212 of FIG. 7A. FIG. 7A additionally illustrates cables 210 positioned in or routed through cradles 404 of the multicable clips 202.

Figure 7B:
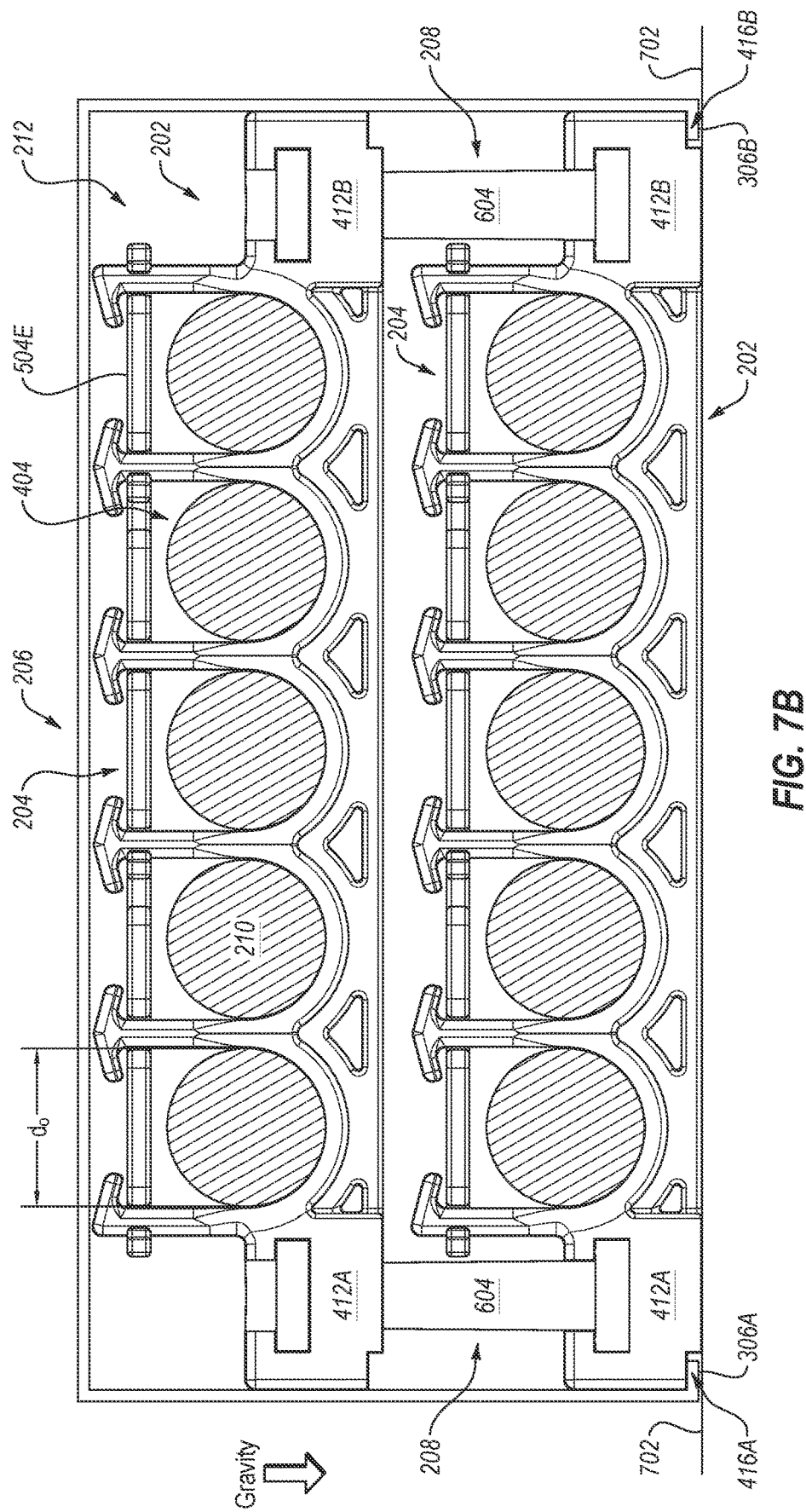
FIG. 7B is a front view of the stacked retention assembly of FIG. 7A with a base multicable clip positioned beneath an elevated multicable clip relative to gravity.

FIG. 7B is a front view of the stacked retention assembly 212 of FIG. 7A with the base multicable clip 202 positioned beneath the elevated multicable clip 202 relative to gravity, arranged in accordance with at least one embodiment described herein. The stacked retention assembly 212 is shown coupled, e.g., through pedestals 412 of the base multicable clip 202, to an installation structure 702 such as a floor of an installation site. As in other FIGS. herein, reference labels are applied to some components, but not necessarily all components, for simplicity.

FIG. 7B additionally illustrates the cables 210 positioned in or routed through the cradles 404 of the multicable clips 202. As illustrated in FIG. 7B, the force of gravity in FIG. 7B pulls the cables 210 toward the installation structure 702 within the cradles 404.

Figure 7C:
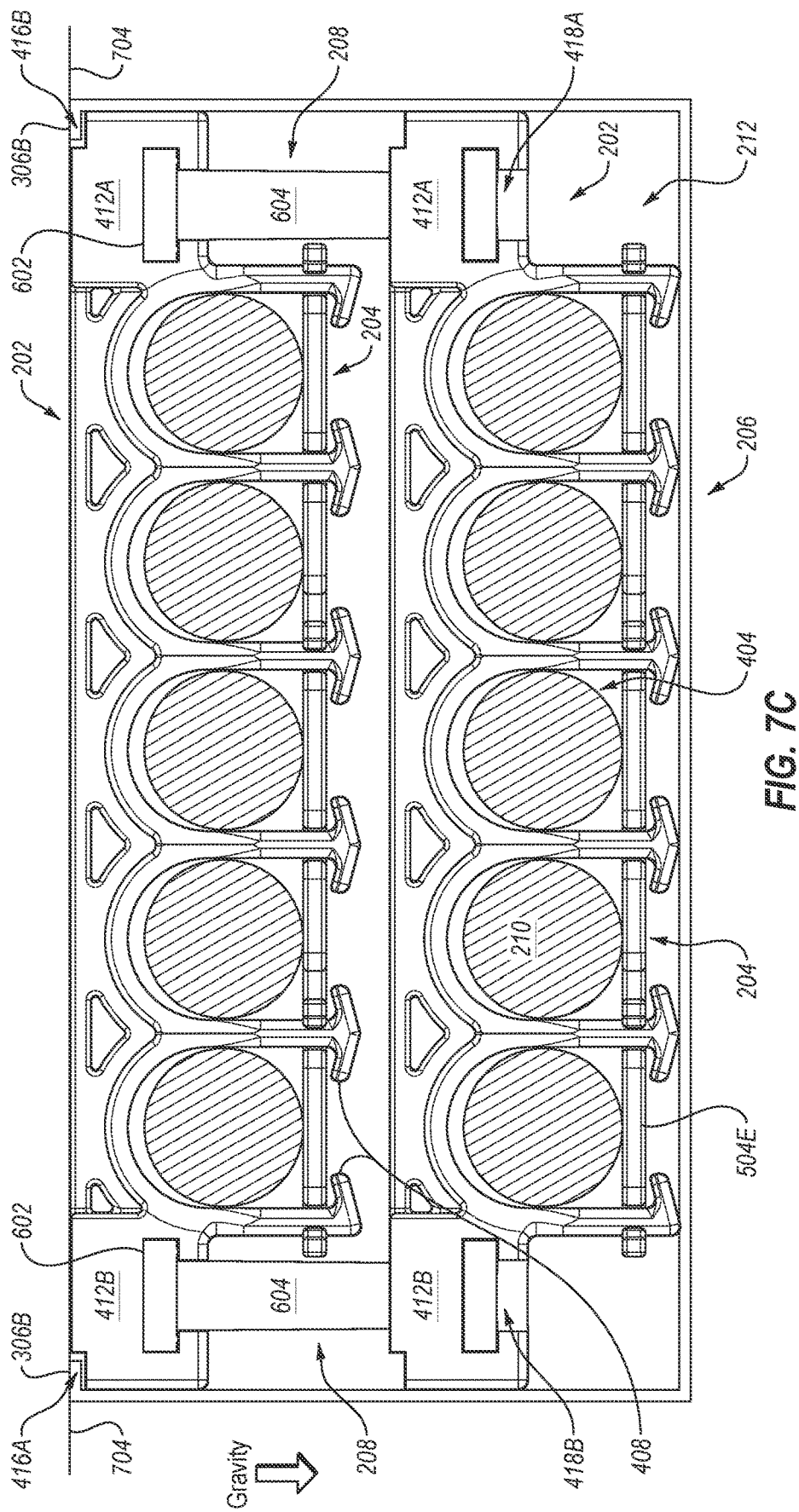
FIG. 7C is a front view of the stacked retention assembly of FIG. 7A with the base multicable clip positioned above the elevated multicable clip relative to gravity.

FIG. 7C is a front view of the stacked retention assembly 212 of FIG. 7A with the base multicable clip 202 positioned above the elevated multicable clip 202 relative to gravity, arranged in accordance with at least one embodiment described herein. The stacked retention assembly 212 is shown coupled, e.g., through pedestals 212 of the base multicable clip 202, to an installation structure 704 such as a ceiling of an installation site. As in other FIGS. herein, reference labels are applied to some components, but not necessarily all components, for simplicity.

FIG. 7C additionally illustrates the cables 210 positioned in or routed through the cradles 404 of the multicable clips 202. As illustrated in FIG. 7C, the force of gravity in FIG. 7C pulls the cables 210 within the cradles 404 away from the installation structure 704. The cradle retention fingers 408 prevent retention plates 204 from being disconnected from the multicable clips 202 by gravity. The retention plates 204 together with the multicable clips 202 thereby prevent the cables 210 from being pulled out of the cradles 404 by gravity. It can additionally be seen from FIG. 7C that the complementary shapes of the riser recesses 418 (of the base multicable clip 202) and the bases 602 and columns 608 of the risers 208 with the neck width $w_n$, being narrower than the enlarged width $w_e$ prevents the risers 208 from being pulled out of the pedestals 412 of the base multicable clip 202 by gravity, even without using fasteners (such as screws or bolts) to secure the pedestals 412 of the base multicable clip 202 to the risers 208. Optionally, fasteners may additionally be used to secure the pedestals 412 of the base multicable clip 202 to the risers 208.

FIGS. 7B and 7C further illustrate the cable raceway 206 coupled to pedestals 412 of the base multicable clip 202. It can be seen in FIGS. 7B and 7C that the retention flanges 306 of the cable raceway 206 engage the shoulders 416 of the base multicable clip 202 to secure the cable raceway 206 to the base multicable clip 202 and more generally to the stacked retention assembly 212. The configuration of the cable raceway 206 and the base multicable clip 202, specifically the retention flanges 306 of the cable raceway 206 and the shoulders 416 of the base multicable clip 202, may secure the cable raceway to the base multicable clip 202 in any orientation of the cable raceway 206 and the base multicable clip 202 relative to gravity. For example, as illustrated in FIG. 7C, seating the retention flanges 306 in the shoulders 416 may prevent gravity from pulling the cable raceway 206 downward away from the stacked retention assembly 212.

Figure 8A:
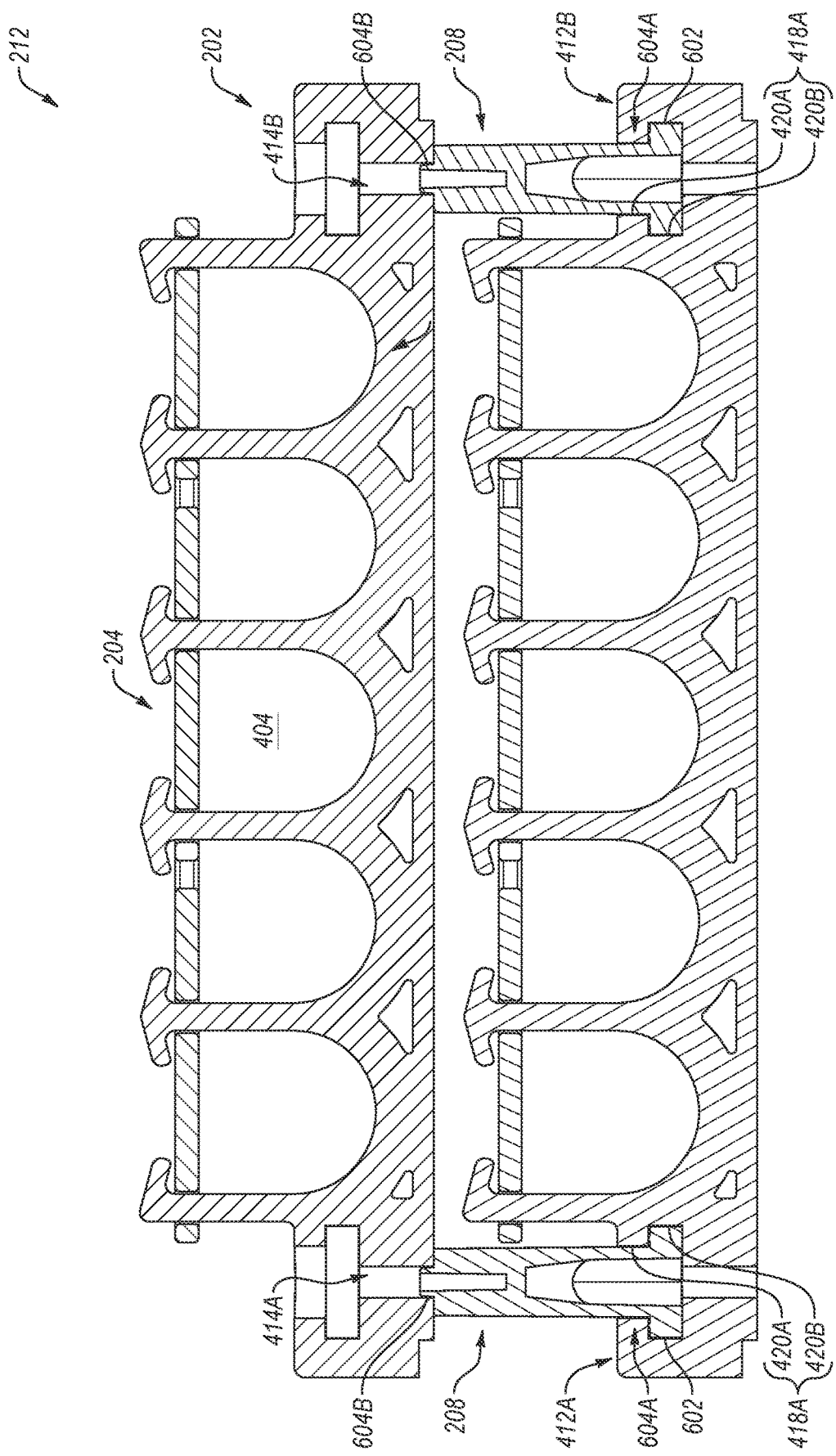
FIGS. 8A-8D include cross-sectional views of the retention assembly of FIGS. 7A-7C.
Figure 8B:
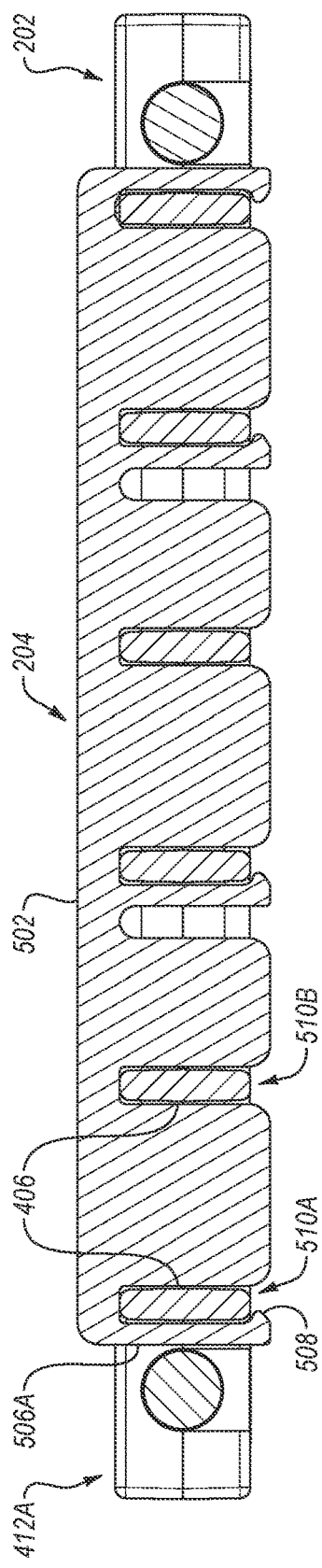
Figure 8D:
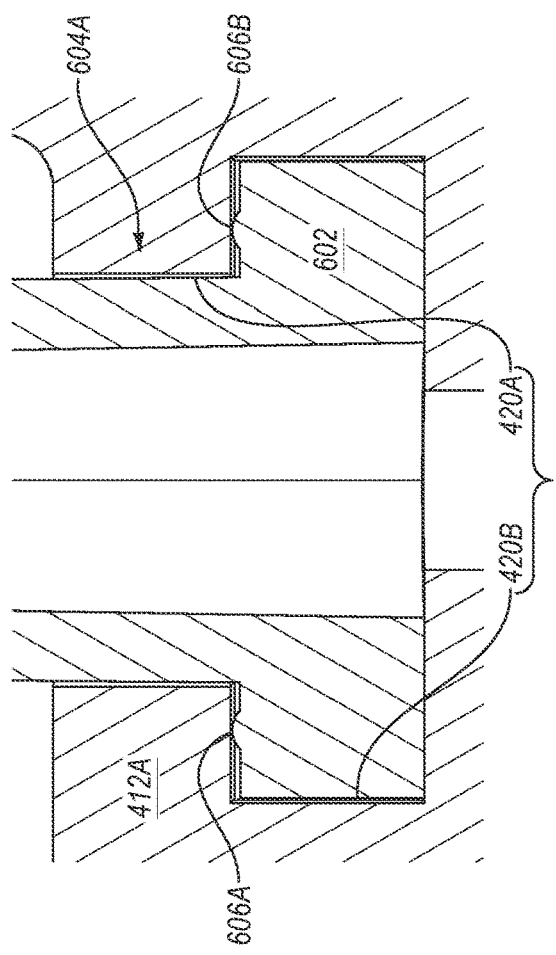
Figure 8C:
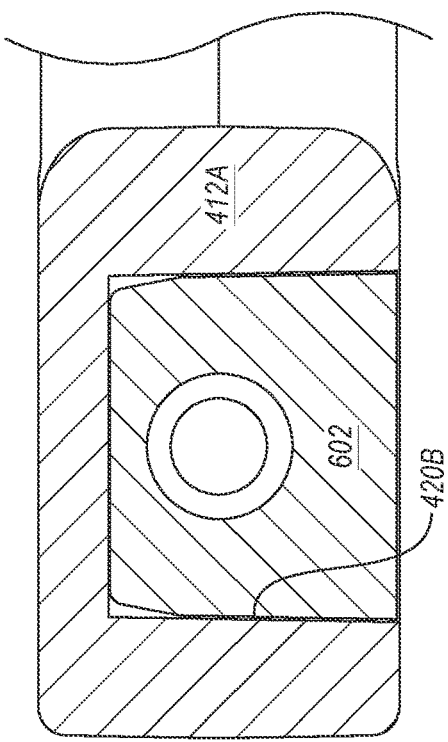

FIGS. 8A-8D include cross-sectional views of the retention assembly 212 of FIGS. 7A-7C, arranged in accordance with at least one embodiment described herein. In particular, FIG. 8A is a front cross-sectional view of the retention assembly 212 at cutting plane 8A-8A in FIG. 7A, FIG. 8B is an overhead cross-sectional view of the retention assembly 212 at cutting plane 8B-8B in FIG. 7A, FIG. 8C is an overhead cross-sectional view (in the same direction as FIG. 8B) through one of the pedestals 412 and bases 602 of the retention assembly 212, and FIG. 8D is a front cross-sectional view (in the same direction as FIG. 8A) through one of the pedestals 412 and bases 602 of the stacked retention assembly 212. As in other FIGS. herein, reference labels are applied to some components, but not necessarily all components, for simplicity.

FIG. 8A illustrates how the risers 208 mate with the pedestals 208 of the multicable clips 202 in the stacked retention assembly 212. For example, the tip 604B of each riser 208 may be received within the corresponding through hole 414 of the corresponding pedestal 412 of the elevated multicable clip 202. In addition, the base 602 and the portion 604A of each riser 208 may be received in the riser recess 418 of the base multicable clip 202.

FIG. 8B illustrates how the retention plate 204 mates with the multicable clip 202. As illustrated, each of the clip arms 406 is received within a corresponding one of the arm voids 510. For example, the two clip arms 406 closest to the pedestal 412A are received within the arm voids 510A, 510B. In addition, when the retention plate 204 and the multicable clip 202 are coupled together, the end protrusions 508 at the ends of the plate retention fingers 506 are positioned behind (i.e., on the opposite side of the clip arms 406 from the spine 502) the clip arms 406 to secure the retention plate 204 to the multicable clip 202. When removing the retention plate 204, a removal force on the retention plate 204 (up in FIG. 8B) forces the plate retention fingers 506 to flex backward sufficiently for the end protrusions 508 to clear the clip arms 406.

FIG. 8C illustrates the base 602 of the riser 208 received in the enlarged portion 420B of the riser recess 418 of the pedestal 412A. The wedge or taper shape of the base 602 may simplify initial alignment and insertion of the base 602 into the enlarged portion 420 and/or may increase friction as the base 602 is fully inserted into the enlarged portion 420B to frictionally secure the base 602 in the pedestal 412A.

FIG. 8D illustrates the base 602 and portion 604A of the riser 208 received in the riser recess 418 of the pedestal 412A. The retention ridges 606 may increase friction as the base 602 and portion 604A of the riser 208 are inserted into the riser recess 418 to frictionally secure the base 602 in the pedestal 412A.

Figure 9:
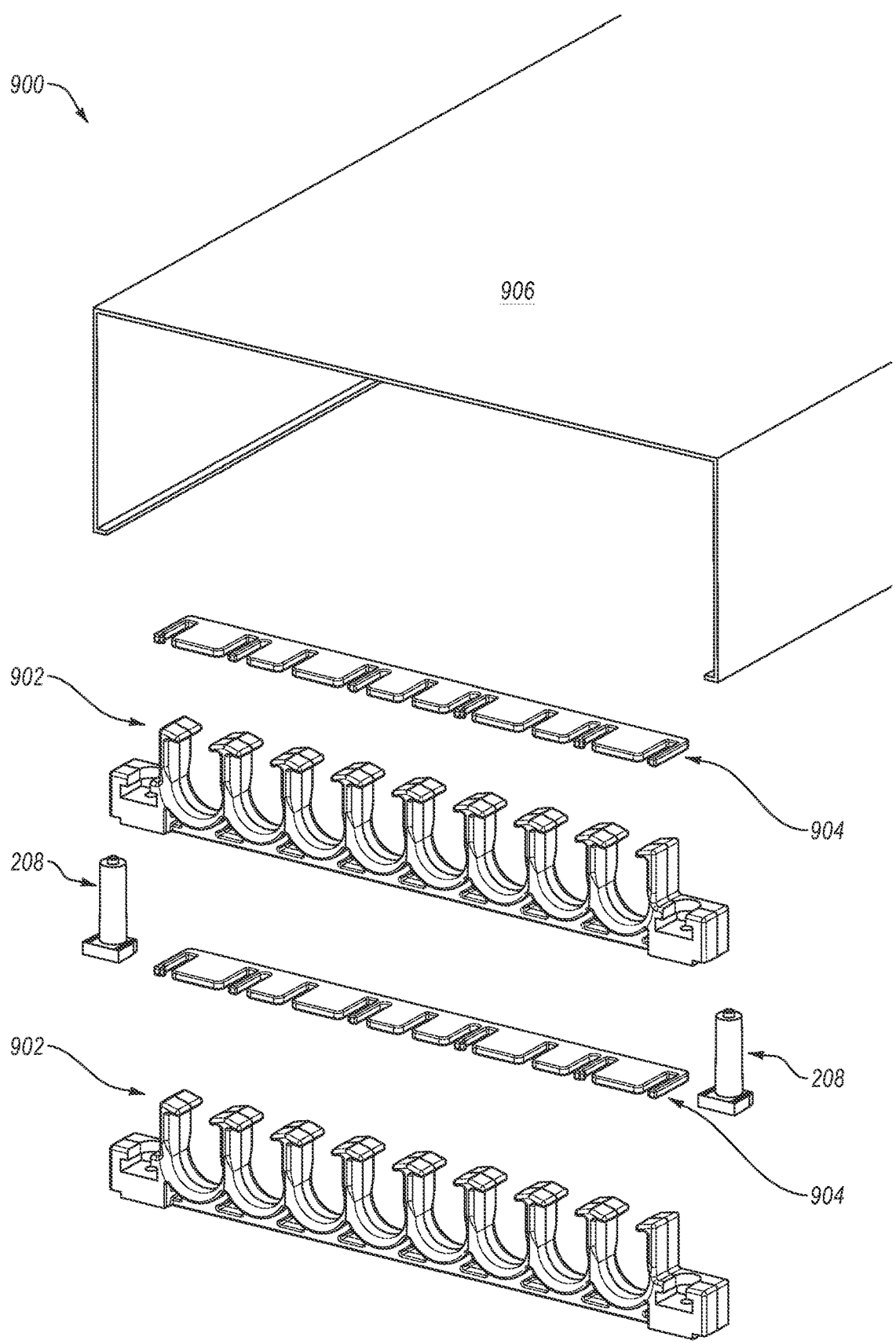
FIG. 9 illustrates another example cable management system, all arranged in accordance with at least one embodiment described herein.

FIG. 9 illustrates another example cable management system 900 (hereinafter "system 900"), arranged in accordance with at least one embodiment described herein. The system 900 may include, be included in, or correspond to one or more of the cable management systems 104 of FIG. 1. FIG. 9 includes an exploded top front perspective view of the system 900. As illustrated, the system 900 may include one or more multicable clips 902, one or more retention plates 904, a cable raceway 906, and/or one or more risers 208. Electrical cables (such as the cables 210) are omitted from FIG. 9 for clarity.

Each multicable clip 902 is configured to receive and secure multiple cables. In particular, each of the multicable clips 902 may be configured to receive and secure eight cables. The retention plates 904 couple to the multicable clips 902 to retain the cables in the multicable clip after placement therein. Two or more multicable clips 902 may be stacked together through the risers 208. The risers 208 couple the multicable clips 902 together (optionally with one or more threaded fasteners or other fasteners).

The multicable clips 902, the retention plates 904, and the cable raceway 906 are similar to the multicable clips 202, the retention plates 204, and the cable raceway 206 herein except that the multicable clips 902, the retention plates 904, and the cable raceway 906 are configured to receive and secure eight cables rather than five cables. As such, each of the multicable clips 902 includes eight cradles and each of the retention plates 904 includes eight spacers with the cable raceway 906 widened compared to the cable raceway 206 to accommodate the wider multicable clips 902 and retention plates 904 (relative to the multicable clips 202 and retention plates 904). All of the disclosure herein regarding the multicable clips 202, the retention plates 204, and the cable raceway 206 may similarly apply to the multicable clips 902, the retention plates 904, and the cable raceway 906 of FIG. 9.

Unless specific arrangements described herein are mutually exclusive with one another, the various implementations described herein can be combined to enhance system functionality or to produce complementary functions. Likewise, aspects of the implementations may be implemented in standalone arrangements. Thus, the above description has been given by way of example only and modification in detail may be made within the scope of the present invention.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A multicable clip, the multicable clip comprising:
an elongate base having a first end and a second end opposite the first end;
a plurality of cradles extending from the base, each of the cradles configured to receive a corresponding cable, each of the cradles having a narrower width at its opening than within the cradle;
a first pedestal formed at the first end of the base, the first pedestal having a first shoulder to engage a first retention flange of a cable raceway; and
a second pedestal formed at the second end of the base, the second pedestal having a second shoulder to engage a second retention flange of the cable raceway, the first and second pedestals configured to couple the multicable clip to one or more installation structures;
wherein:
each of the first and second pedestals defines a riser recess configured to receive a portion of a corresponding riser; and
the riser recess includes, in a direction in which the cradles extend from the base, an enlarged portion and a neck portion, a base of the riser being complementary to the enlarged portion and a portion of a column of the riser that extends from the base being complementary to the neck portion, the neck portion configured to prevent the riser from moving relative to the multicable clip in the direction in which the cradles extend from the base.

2. The multicable clip of claim 1, wherein:
each of the cradles comprises a corresponding pair of clip arms extending from the base and a portion of the base between the pair of clip arms; and
one or both clip arms of each pair of clip arms is shared between two corresponding adjacent cradles.

3. The multicable clip of claim 2, further comprising a plurality of cradle retention fingers partially extending across each cradle, the opening of each cradle defined by a corresponding pair of cradle retention fingers extending from a corresponding pair of clip arms.

4. The multicable clip of claim 2, wherein each of the clip arms in a given pair is configured to temporarily flex outward as the corresponding cable passes through the corresponding opening and to return toward an unflexed state after complete passage of the corresponding cable through the corresponding opening into the corresponding cradle.

5. The multicable clip of claim 1, further comprising a plurality of openings defined in the base, including at least one opening per cradle.

6. The multicable clip of claim 5, wherein each opening of the plurality of openings is configured to receive therethrough an elongate fastener to secure the cable in the cradle.

7. The multicable clip of claim 1, wherein each of the first and second pedestals defines a through hole configured to receive therethrough a fastener to couple the multicable clip to the one or more installation structures.

8. A multicable clip, the multicable clip comprising:
a base;
a plurality of clip arms extending in a common direction from the base, each of the clip arms having a first end at the base and a second end opposite the first end, each pair of adjacent clip arms and the base forming a cradle configured to receive therein a portion of a corresponding cable;
a plurality of cradle retention fingers extending from the second ends of the plurality of clip arms, including a cradle retention finger extending from the second end of each clip arm toward an adjacent clip arm;
wherein:
an opening width of each cradle at its opening and between cradle retention fingers extending from adjacent clip arms of each cradle is less than an outer diameter of the corresponding cable and less than a cradle width between the clip arms of each cradle;
each of the plurality of clip arms is resiliently deformable and configured to resiliently deform in response to passage of the corresponding cable through the corresponding opening of the corresponding cradle;
the base has a first end and a second end opposite the first end, the multicable clip further comprising a first pedestal formed at the first end of the base and a second pedestal formed at the second end of the base;
each of the first and second pedestals defines a riser recess having an interior shape that is complementary to an exterior shape of a portion of a riser configured to be received in the riser recess; and
the riser recess includes a neck portion and an enlarged portion, the neck portion having a neck width and the enlarged portion having an enlarged width that is greater than the neck width.

9. The multicable clip of claim 8, further comprising a plurality of openings defined in the base.

10. The multicable clip of claim 9, wherein the plurality of openings includes, for each of the plurality of clip arms, an opening formed in the base at the first end of the corresponding clip arm.

11. The multicable clip of claim 9, wherein each opening of the plurality of openings is configured to receive therethrough a zip tie to secure the cable in the cradle.

12. The multicable clip of claim 11, wherein the cradle width between the clip arms of each cradle is greater than or equal to the outer diameter of the corresponding cable.

13. The multicable clip of claim 8, wherein each of the first and second pedestals is configured to couple the multicable clip to one or more installation structures.

14. The multicable clip of claim 8, wherein each of the first and second pedestals defines a through hole configured to receive therethrough a fastener.

15. The multicable clip of claim 8, wherein:
the riser comprises a base and a column that extends from the base;
the portion of the riser configured to be received in the riser recess includes the base of the riser and a portion of the column of the riser that is proximate to the base of the riser;
the base of the riser has a base width that is less than or equal to the enlarged width;
the column of the riser has a column width that is less than or equal to the neck width;
the neck portion of the riser recess in the multicable clip is configured to receive the portion of the column of the riser that is proximate to the base of the riser; and
the enlarged portion of the riser recess in the multicable clip is configured to receive the base of the riser.

16. The multicable clip of claim 8, wherein:
the first pedestal has a first shoulder formed therein to engage a first retention flange of a cable raceway; and
the second pedestal has a second shoulder formed therein to engage a second retention flange of the cable raceway.

17. A multicable clip, the multicable clip comprising:
an elongate base having a first end and a second end opposite the first end;
a plurality of cradles extending from the base, each of the cradles configured to receive a corresponding cable, each of the cradles having a narrower width at its opening than within the cradle;
a first pedestal formed at the first end of the base, the first pedestal having a first shoulder to engage a first retention flange of a cable raceway; and
a second pedestal formed at the second end of the base, the second pedestal having a second shoulder to engage a second retention flange of the cable raceway, the first and second pedestals configured to couple the multicable clip to one or more installation structures;
wherein:
each of the cradles comprises a corresponding pair of clip arms extending from the base and a portion of the base between the pair of clip arms;
one or both clip arms of each pair of clip arms is shared between two corresponding adjacent cradles;
the multicable clip further comprises a plurality of cradle retention fingers partially extending across each cradle, the opening of each cradle defined by a corresponding pair of cradle retention fingers extending from a corresponding pair of clip arms;
a leading surface of each of the plurality of cradle retention fingers furthest from the base is angled toward the base; and
a trailing surface of each of the plurality of cradle retention fingers closest to the base is angled toward the base.

18. The multicable clip of claim 17, wherein the first and second shoulders are formed in bottoms of the first and second pedestals to engage the first and second retention flanges of the cable raceway that covers the multicable clip from top to bottom.

19. The multicable clip of claim 17, wherein:
each of the cradles comprises a corresponding pair of clip arms extending from the base and a portion of the base between the pair of clip arms;
one or both clip arms of each pair of clip arms is shared between two corresponding adjacent cradles, the cradles and the clip arms are aligned in a line;
a first cradle at a first end of the line of cradles includes a first clip arm that is not shared with any other cradle;
a second cradle at a second end of the line of cradles that is opposite to the first end includes a second clip arm that is not shared with any other cradle;
the first clip arm extends from an end of the first pedestal; and
the second clip arm extends from an end of the second pedestal.

20. The multicable clip of claim 17, wherein each of the first and second pedestals defines a riser recess with a first opening that faces longitudinally joined with a second opening that faces vertically, the first opening having a larger lateral dimension than the second opening.

21. The multicable clip of claim 17, wherein each of the first and second pedestals consists essentially of a rectangular prism.

* * * * *